(12) United States Patent
Chui et al.

(10) Patent No.: US 7,936,497 B2
(45) Date of Patent: May 3, 2011

(54) MEMS DEVICE HAVING DEFORMABLE MEMBRANE CHARACTERIZED BY MECHANICAL PERSISTENCE

(75) Inventors: Clarence Chui, San Mateo, CA (US); Manish Kothari, Cupertino, CA (US)

(73) Assignee: Qualcomm Mems Technologies, Inc., San Diego, CA (US)

( * ) Notice: Subject to any disclaimer, the term of this patent is extended or adjusted under 35 U.S.C. 154(b) by 1230 days.

(21) Appl. No.: 11/192,438

(22) Filed: Jul. 28, 2005

(65) Prior Publication Data

US 2006/0077156 A1    Apr. 13, 2006

Related U.S. Application Data

(60) Provisional application No. 60/613,593, filed on Sep. 27, 2004, provisional application No. 60/613,450, filed on Sep. 27, 2004.

(51) Int. Cl.
*G02B 26/00* (2006.01)

(52) U.S. Cl. .......................... 359/290; 359/292

(58) Field of Classification Search .............. 359/290, 359/291, 292, 295, 298, 220, 223, 224, 320, 359/323, 324
See application file for complete search history.

(56) References Cited

U.S. PATENT DOCUMENTS

| | | | |
|---|---|---|---|
| 2,534,846 A | 12/1950 | Ambrose et al. |
| 2,677,714 A | 5/1954 | Auwarter |
| 3,247,392 A | 4/1966 | Thelen |
| 3,439,973 A | 4/1969 | Paul et al. |
| 3,443,854 A | 5/1969 | Weiss |
| 3,653,741 A | 4/1972 | Marks |
| 3,656,836 A | 4/1972 | de Cremoux et al. |
| 3,725,868 A | 4/1973 | Malmer, Jr. et al. |
| 3,728,030 A | 4/1973 | Hawes |
| 3,813,265 A | 5/1974 | Marks |
| 3,886,310 A | 5/1975 | Guldberg |
| 3,955,190 A | 5/1976 | Teraishi |
| 3,955,880 A | 5/1976 | Lierke |
| 4,099,854 A | 7/1978 | Decker et al. |
| 4,196,396 A | 4/1980 | Smith |
| 4,228,437 A | 10/1980 | Shelton |
| 4,377,324 A | 3/1983 | Durand et al. |

(Continued)

FOREIGN PATENT DOCUMENTS

DE    4108966 A1    8/1992

(Continued)

OTHER PUBLICATIONS

ISR and WO for PCT/US05/030761 filed Aug. 29, 2005.

(Continued)

*Primary Examiner* — Ricky L Mack
*Assistant Examiner* — Tuyen Q Tra
(74) *Attorney, Agent, or Firm* — Knobbe Martens Olson & Bear LLP

(57) ABSTRACT

An interferometric modulator is provided having a faster deformation time constant on actuation than relaxation time constant upon release from actuation. In some embodiments, apertures are formed in a mechanical membrane to decrease pressure, including liquid and/or gas pressures, on the membrane when actuated. In other embodiments, a dampening layer is disposed in close proximity above the membrane to apply greater downward pressure on the membrane and therefore slow the motion of the membrane when released from an actuated state. Other embodiments comprise structures, such as a heating element or vacuum device, to manipulate pressures above and/or below the mechanical membrane to affect the mechanical persistence of the display device.

71 Claims, 17 Drawing Sheets

U.S. PATENT DOCUMENTS

| | | |
|---|---|---|
| 4,389,096 A | 6/1983 | Hori et al. |
| 4,392,711 A | 7/1983 | Moraw et al. |
| 4,403,248 A | 9/1983 | te Velde |
| 4,421,381 A | 12/1983 | Ueda et al. |
| 4,441,789 A | 4/1984 | Pohlack |
| 4,441,791 A | 4/1984 | Hornbeck |
| 4,445,050 A | 4/1984 | Marks |
| 4,459,182 A | 7/1984 | te Velde |
| 4,482,213 A | 11/1984 | Piliavin et al. |
| 4,497,974 A | 2/1985 | Deckman et al. |
| 4,498,953 A | 2/1985 | Cook et al. |
| 4,500,171 A | 2/1985 | Penz et al. |
| 4,519,676 A | 5/1985 | te Velde |
| 4,531,126 A | 7/1985 | Sadones |
| 4,560,435 A | 12/1985 | Brown et al. |
| 4,566,935 A | 1/1986 | Hornbeck |
| 4,571,603 A | 2/1986 | Hornbeck et al. |
| 4,596,992 A | 6/1986 | Hornbeck |
| 4,615,595 A | 10/1986 | Hornbeck |
| 4,655,554 A | 4/1987 | Armitage |
| 4,662,746 A | 5/1987 | Hornbeck |
| 4,663,083 A | 5/1987 | Marks |
| 4,666,254 A | 5/1987 | Itoh et al. |
| 4,681,403 A | 7/1987 | te Velde et al. |
| 4,710,732 A | 12/1987 | Hornbeck |
| 4,748,366 A | 5/1988 | Taylor |
| 4,779,959 A | 10/1988 | Saunders |
| 4,786,128 A | 11/1988 | Birnbach |
| 4,790,635 A | 12/1988 | Apsley |
| 4,856,863 A | 8/1989 | Sampsell et al. |
| 4,857,978 A | 8/1989 | Goldburt et al. |
| 4,859,060 A | 8/1989 | Katagiri et al. |
| 4,900,136 A | 2/1990 | Goldburt et al. |
| 4,900,395 A | 2/1990 | Syverson et al. |
| 4,925,259 A | 5/1990 | Emmett |
| 4,937,496 A | 6/1990 | Neiger et al. |
| 4,954,789 A | 9/1990 | Sampsell |
| 4,956,619 A | 9/1990 | Hornbeck |
| 4,965,562 A | 10/1990 | Verhulst |
| 4,973,131 A | 11/1990 | Carnes |
| 4,982,184 A | 1/1991 | Kirkwood |
| 5,018,256 A | 5/1991 | Hornbeck |
| 5,022,745 A | 6/1991 | Zayhowski et al. |
| 5,028,939 A | 7/1991 | Hornbeck et al. |
| 5,037,173 A | 8/1991 | Sampsell et al. |
| 5,044,736 A | 9/1991 | Jaskie et al. |
| 5,061,049 A | 10/1991 | Hornbeck |
| 5,062,689 A | 11/1991 | Koehler |
| 5,075,796 A | 12/1991 | Schildkraut et al. |
| 5,078,479 A | 1/1992 | Vuilleumier |
| 5,079,544 A | 1/1992 | DeMond et al. |
| 5,083,857 A | 1/1992 | Hornbeck |
| 5,091,983 A | 2/1992 | Lukosz |
| 5,096,279 A | 3/1992 | Hornbeck et al. |
| 5,099,353 A | 3/1992 | Hornbeck |
| 5,124,834 A | 6/1992 | Cusano et al. |
| 5,136,669 A | 8/1992 | Gerdt |
| 5,142,405 A | 8/1992 | Hornbeck |
| 5,142,414 A | 8/1992 | Koehler |
| 5,153,771 A | 10/1992 | Link et al. |
| 5,162,787 A | 11/1992 | Thompson et al. |
| 5,168,406 A | 12/1992 | Nelson |
| 5,170,156 A | 12/1992 | DeMond et al. |
| 5,170,283 A | 12/1992 | O'Brien et al. |
| 5,172,262 A | 12/1992 | Hornbeck |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,212,582 A | 5/1993 | Nelson |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,228,013 A | 7/1993 | Bik |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,293,272 A | 3/1994 | Jannson et al. |
| 5,296,950 A | 3/1994 | Lin et al. |
| 5,305,640 A | 4/1994 | Boysel et al. |
| 5,311,360 A | 5/1994 | Bloom et al. |
| 5,312,513 A | 5/1994 | Florence et al. |
| 5,315,370 A | 5/1994 | Bulow |
| 5,323,002 A | 6/1994 | Sampsell et al. |
| 5,324,683 A | 6/1994 | Fitch et al. |
| 5,325,116 A | 6/1994 | Sampsell |
| 5,326,430 A | 7/1994 | Cronin et al. |
| 5,327,286 A | 7/1994 | Sampsell et al. |
| 5,331,454 A | 7/1994 | Hornbeck |
| 5,339,116 A | 8/1994 | Urbanus et al. |
| 5,345,328 A | 9/1994 | Fritz et al. |
| 5,355,357 A | 10/1994 | Yamamori et al. |
| 5,358,601 A | 10/1994 | Cathey |
| 5,365,283 A | 11/1994 | Doherty et al. |
| 5,381,232 A | 1/1995 | van Wijk |
| 5,381,253 A | 1/1995 | Sharp et al. |
| 5,401,983 A | 3/1995 | Jokerst et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,452,138 A | 9/1995 | Mignardi et al. |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,459,610 A | 10/1995 | Bloom et al. |
| 5,461,411 A | 10/1995 | Florence et al. |
| 5,471,341 A | 11/1995 | Warde et al. |
| 5,474,865 A | 12/1995 | Vasudev |
| 5,489,952 A | 2/1996 | Gove et al. |
| 5,497,172 A | 3/1996 | Doherty et al. |
| 5,497,197 A | 3/1996 | Gove et al. |
| 5,499,037 A | 3/1996 | Nakagawa et al. |
| 5,499,062 A | 3/1996 | Urbanus |
| 5,500,635 A | 3/1996 | Mott |
| 5,500,761 A | 3/1996 | Goossen et al. |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,327 A | 6/1996 | Cordova, Jr. |
| 5,526,688 A | 6/1996 | Boysel et al. |
| 5,535,047 A | 7/1996 | Hornbeck |
| 5,548,301 A | 8/1996 | Kornher et al. |
| 5,551,293 A | 9/1996 | Boysel et al. |
| 5,552,924 A | 9/1996 | Tregilgas |
| 5,552,925 A | 9/1996 | Worley |
| 5,559,358 A | 9/1996 | Burns et al. |
| 5,561,523 A | 10/1996 | Blomberg et al. |
| 5,563,398 A | 10/1996 | Sampsell |
| 5,567,334 A | 10/1996 | Baker et al. |
| 5,570,135 A | 10/1996 | Gove et al. |
| 5,579,149 A | 11/1996 | Moret et al. |
| 5,581,272 A | 12/1996 | Conner et al. |
| 5,583,688 A | 12/1996 | Hornbeck |
| 5,589,852 A | 12/1996 | Thompson et al. |
| 5,597,736 A | 1/1997 | Sampsell |
| 5,600,383 A | 2/1997 | Hornbeck |
| 5,602,671 A | 2/1997 | Hornbeck |
| 5,606,441 A | 2/1997 | Florence et al. |
| 5,608,468 A | 3/1997 | Gove et al. |
| 5,610,438 A | 3/1997 | Wallace et al. |
| 5,610,624 A | 3/1997 | Bhuva |
| 5,610,625 A | 3/1997 | Sampsell |
| 5,614,937 A | 3/1997 | Nelson |
| 5,619,059 A | 4/1997 | Li et al. |

| Patent No. | Kind | Date | Inventor |
|---|---|---|---|
| 5,619,365 | A | 4/1997 | Rhoades et al. |
| 5,619,366 | A | 4/1997 | Rhoads et al. |
| 5,629,790 | A | 5/1997 | Neukermans et al. |
| 5,633,652 | A | 5/1997 | Kanbe et al. |
| 5,636,052 | A | 6/1997 | Arney et al. |
| 5,636,185 | A | 6/1997 | Brewer et al. |
| 5,638,084 | A | 6/1997 | Kalt |
| 5,638,946 | A | 6/1997 | Zavracky |
| 5,641,391 | A | 6/1997 | Hunter et al. |
| 5,646,729 | A | 7/1997 | Koskinen et al. |
| 5,646,768 | A | 7/1997 | Kaeiyama |
| 5,650,881 | A | 7/1997 | Hornbeck |
| 5,654,741 | A | 8/1997 | Sampsell et al. |
| 5,657,099 | A | 8/1997 | Doherty et al. |
| 5,659,374 | A | 8/1997 | Gale, Jr. et al. |
| 5,661,591 | A | 8/1997 | Lin et al. |
| 5,661,592 | A | 8/1997 | Bornstein et al. |
| 5,665,997 | A | 9/1997 | Weaver et al. |
| 5,673,139 | A | 9/1997 | Johnson |
| 5,683,591 | A | 11/1997 | Offenberg |
| 5,699,181 | A | 12/1997 | Choi |
| 5,703,710 | A | 12/1997 | Brinkman et al. |
| 5,710,656 | A | 1/1998 | Goosen |
| 5,719,068 | A | 2/1998 | Suzawa et al. |
| 5,726,480 | A | 3/1998 | Pister |
| 5,734,177 | A | 3/1998 | Sakamoto |
| 5,739,945 | A | 4/1998 | Tayebati |
| 5,740,150 | A | 4/1998 | Uchimaru et al. |
| 5,745,193 | A | 4/1998 | Urbanus et al. |
| 5,745,281 | A | 4/1998 | Yi et al. |
| 5,751,469 | A | 5/1998 | Arney et al. |
| 5,771,116 | A | 6/1998 | Miller et al. |
| 5,784,190 | A | 7/1998 | Worley |
| 5,784,212 | A | 7/1998 | Hornbeck |
| 5,786,927 | A | 7/1998 | Greywall et al. |
| 5,793,504 | A | 8/1998 | Stoll |
| 5,808,780 | A | 9/1998 | McDonald |
| 5,808,781 | A | 9/1998 | Arney et al. |
| 5,818,095 | A | 10/1998 | Sampsell |
| 5,825,528 | A | 10/1998 | Goosen |
| 5,835,255 | A | 11/1998 | Miles |
| 5,838,484 | A | 11/1998 | Goossen et al. |
| 5,842,088 | A | 11/1998 | Thompson |
| 5,867,302 | A | 2/1999 | Fleming |
| 5,870,221 | A | 2/1999 | Goossen |
| 5,905,482 | A | 5/1999 | Hughes et al. |
| 5,912,758 | A | 6/1999 | Knipe et al. |
| 5,914,804 | A | 6/1999 | Goossen |
| 5,920,418 | A | 7/1999 | Shiono et al. |
| 5,943,158 | A | 8/1999 | Ford et al. |
| 5,959,763 | A | 9/1999 | Bozler et al. |
| 5,961,848 | A | 10/1999 | Jacquet et al. |
| 5,986,796 | A | 11/1999 | Miles |
| 5,994,174 | A | 11/1999 | Carey et al. |
| 6,028,689 | A | 2/2000 | Michalicek et al. |
| 6,028,690 | A | 2/2000 | Carter et al. |
| 6,038,056 | A | 3/2000 | Florence et al. |
| 6,040,937 | A | 3/2000 | Miles |
| 6,046,659 | A | 4/2000 | Loo et al. |
| 6,046,840 | A | 4/2000 | Huibers |
| 6,049,317 | A | 4/2000 | Thompson et al. |
| 6,055,090 | A | 4/2000 | Miles |
| 6,056,406 | A | 5/2000 | Park et al. |
| 6,061,075 | A | 5/2000 | Nelson et al. |
| 6,097,145 | A | 8/2000 | Kastalsky et al. |
| 6,099,132 | A | 8/2000 | Kaeriyama |
| 6,100,861 | A | 8/2000 | Cohen et al. |
| 6,100,872 | A | 8/2000 | Aratani et al. |
| 6,113,239 | A | 9/2000 | Sampsell et al. |
| 6,147,790 | A | 11/2000 | Meier et al. |
| 6,154,586 | A * | 11/2000 | MacDonald et al. ........... 385/18 |
| 6,158,156 | A | 12/2000 | Patrick |
| 6,160,833 | A | 12/2000 | Floyd et al. |
| 6,171,945 | B1 | 1/2001 | Mandal et al. |
| 6,172,797 | B1 | 1/2001 | Huibers |
| 6,180,428 | B1 | 1/2001 | Peeters et al. |
| 6,195,196 | B1 | 2/2001 | Kimura et al. |
| 6,201,633 | B1 | 3/2001 | Peeters et al. |
| 6,215,221 | B1 | 4/2001 | Cabuz et al. |
| 6,232,936 | B1 | 5/2001 | Gove et al. |
| 6,239,777 | B1 | 5/2001 | Sugahara et al. |
| 6,242,932 | B1 | 6/2001 | Hembree |
| 6,243,149 | B1 | 6/2001 | Swanson et al. |
| 6,262,697 | B1 | 7/2001 | Stephenson |
| 6,282,010 | B1 | 8/2001 | Sulzbach et al. |
| 6,288,472 | B1 | 9/2001 | Cabuz et al. |
| 6,288,824 | B1 | 9/2001 | Kastalsky |
| 6,295,154 | B1 | 9/2001 | Laor et al. |
| 6,323,982 | B1 | 11/2001 | Hornbeck |
| 6,327,071 | B1 | 12/2001 | Kimura |
| 6,331,909 | B1 | 12/2001 | Dunfield |
| 6,335,235 | B1 | 1/2002 | Bhekta et al. |
| 6,335,831 | B2 | 1/2002 | Kowarz et al. |
| 6,351,329 | B1 | 2/2002 | Greywall |
| 6,356,254 | B1 | 3/2002 | Kimura |
| 6,356,378 | B1 | 3/2002 | Huibers |
| 6,358,021 | B1 | 3/2002 | Cabuz |
| 6,376,787 | B1 | 4/2002 | Martin et al. |
| 6,377,233 | B2 | 4/2002 | Colgan et al. |
| 6,384,952 | B1 | 5/2002 | Clark et al. |
| 6,407,851 | B1 | 6/2002 | Islam et al. |
| 6,417,868 | B1 | 7/2002 | Bock et al. |
| 6,433,917 | B1 | 8/2002 | Mei et al. |
| 6,438,282 | B1 | 8/2002 | Takeda et al. |
| 6,447,126 | B1 | 9/2002 | Hornbeck |
| 6,449,084 | B1 | 9/2002 | Guo |
| 6,452,712 | B2 | 9/2002 | Atobe et al. |
| 6,456,420 | B1 | 9/2002 | Goodwin-Johansson |
| 6,465,355 | B1 | 10/2002 | Horsley |
| 6,466,190 | B1 | 10/2002 | Evoy |
| 6,466,354 | B1 | 10/2002 | Gudeman |
| 6,466,358 | B2 | 10/2002 | Tew |
| 6,473,072 | B1 | 10/2002 | Comiskey et al. |
| 6,473,274 | B1 | 10/2002 | Maimone et al. |
| 6,480,177 | B2 | 11/2002 | Doherty et al. |
| 6,496,122 | B2 | 12/2002 | Sampsell |
| 6,519,073 | B1 | 2/2003 | Goossen |
| 6,545,335 | B1 | 4/2003 | Chua et al. |
| 6,548,908 | B2 | 4/2003 | Chua et al. |
| 6,549,338 | B1 | 4/2003 | Wolverton et al. |
| 6,552,840 | B2 | 4/2003 | Knipe |
| 6,556,338 | B2 | 4/2003 | Han et al. |
| 6,574,033 | B1 | 6/2003 | Chui et al. |
| 6,589,625 | B1 | 7/2003 | Kothari et al. |
| 6,597,490 | B2 | 7/2003 | Tayebati |
| 6,600,201 | B2 | 7/2003 | Hartwell et al. |
| 6,606,175 | B1 | 8/2003 | Sampsell et al. |
| 6,608,268 | B1 | 8/2003 | Goldsmith |
| 6,624,944 | B1 | 9/2003 | Wallace et al. |
| 6,625,047 | B2 | 9/2003 | Coleman, Jr. |
| 6,630,786 | B2 | 10/2003 | Cummings et al. |
| 6,632,698 | B2 | 10/2003 | Ives |
| 6,635,919 | B1 | 10/2003 | Melendez et al. |
| 6,643,069 | B2 | 11/2003 | Dewald |
| 6,650,455 | B2 | 11/2003 | Miles |
| 6,657,832 | B2 | 12/2003 | Williams et al. |
| 6,660,656 | B2 | 12/2003 | Cheung et al. |
| 6,661,561 | B2 | 12/2003 | Fitzpatrick et al. |
| 6,666,561 | B1 | 12/2003 | Blakley |
| 6,674,090 | B1 | 1/2004 | Chua et al. |
| 6,674,562 | B1 | 1/2004 | Miles et al. |
| 6,674,563 | B2 | 1/2004 | Chui et al. |
| 6,680,792 | B2 | 1/2004 | Miles |
| 6,698,295 | B1 | 3/2004 | Sherrer |
| 6,710,908 | B2 | 3/2004 | Miles et al. |
| 6,741,377 | B2 | 5/2004 | Miles |
| 6,741,383 | B2 | 5/2004 | Huibers et al. |
| 6,741,384 | B1 | 5/2004 | Martin et al. |
| 6,741,503 | B1 | 5/2004 | Farris et al. |
| 6,747,785 | B2 | 6/2004 | Chen et al. |
| 6,747,800 | B1 | 6/2004 | Lin |
| 6,768,555 | B2 | 7/2004 | Chen |
| 6,775,174 | B2 | 8/2004 | Huffman et al. |
| 6,778,155 | B2 | 8/2004 | Doherty et al. |
| 6,794,119 | B2 | 9/2004 | Miles |
| 6,807,892 | B2 * | 10/2004 | Biegelsen et al. ................ 91/459 |
| 6,809,788 | B2 | 10/2004 | Yamada et al. |
| 6,811,267 | B1 | 11/2004 | Allen et al. |

| | | |
|---|---|---|
| 6,813,059 B2 | 11/2004 | Hunter et al. |
| 6,819,469 B1 | 11/2004 | Koba |
| 6,822,628 B2 | 11/2004 | Dunphy et al. |
| 6,829,132 B2 | 12/2004 | Martin et al. |
| 6,836,366 B1 | 12/2004 | Flanders et al. |
| 6,841,081 B2 | 1/2005 | Chang et al. |
| 6,844,959 B2 | 1/2005 | Huibers et al. |
| 6,849,471 B2 | 2/2005 | Patel et al. |
| 6,853,129 B1 | 2/2005 | Cummings et al. |
| 6,855,610 B2 | 2/2005 | Tung et al. |
| 6,859,218 B2 | 2/2005 | Luman et al. |
| 6,861,277 B1 | 3/2005 | Monroe et al. |
| 6,862,022 B2 | 3/2005 | Slupe |
| 6,862,029 B1 | 3/2005 | D'Souza et al. |
| 6,862,127 B1 | 3/2005 | Ishii |
| 6,867,896 B2 | 3/2005 | Miles |
| 6,870,581 B2 | 3/2005 | Li et al. |
| 6,870,654 B2 | 3/2005 | Lin et al. |
| 6,882,458 B2 | 4/2005 | Lin et al. |
| 6,882,461 B1 | 4/2005 | Tsai et al. |
| 6,891,658 B2 | 5/2005 | Whitehead et al. |
| 6,912,022 B2 | 6/2005 | Lin et al. |
| 6,913,942 B2 | 7/2005 | Patel et al. |
| 6,940,630 B2 | 9/2005 | Xie |
| 6,947,200 B2 | 9/2005 | Huibers |
| 6,952,303 B2 | 10/2005 | Lin et al. |
| 6,958,847 B2 | 10/2005 | Lin |
| 6,959,990 B2 | 11/2005 | Penn |
| 6,960,305 B2 | 11/2005 | Doan et al. |
| 6,980,350 B2 | 12/2005 | Hung et al. |
| 6,982,820 B2 | 1/2006 | Tsai |
| 7,008,812 B1 | 3/2006 | Carley |
| 7,027,204 B2 | 4/2006 | Trisnadi et al. |
| 7,034,981 B2 | 4/2006 | Makigaki |
| 7,046,422 B2 | 5/2006 | Kimura et al. |
| 7,053,737 B2 | 5/2006 | Schwartz et al. |
| 7,075,700 B2 | 7/2006 | Muenter |
| 7,113,339 B2 | 9/2006 | Taguchi et al. |
| 7,123,216 B1 | 10/2006 | Miles |
| 7,235,914 B2 * | 6/2007 | Richards et al. ............... 310/328 |
| 7,236,284 B2 | 6/2007 | Miles |
| 7,245,285 B2 | 7/2007 | Yeh et al. |
| 7,307,776 B2 * | 12/2007 | Tsai et al. ...................... 359/291 |
| 7,400,488 B2 * | 7/2008 | Lynch et al. ................... 361/277 |
| 7,453,646 B2 * | 11/2008 | Lo ................................. 359/665 |
| 7,459,402 B2 | 12/2008 | Doan et al. |
| 7,508,566 B2 | 3/2009 | Feenstra et al. |
| 7,852,544 B2 | 12/2010 | Sampsell |
| 2001/0003487 A1 | 6/2001 | Miles |
| 2001/0028503 A1 * | 10/2001 | Flanders et al. ............... 359/578 |
| 2001/0043171 A1 | 11/2001 | Van Gorkom et al. |
| 2002/0014579 A1 | 2/2002 | Dunfield |
| 2002/0015215 A1 | 2/2002 | Miles |
| 2002/0021485 A1 | 2/2002 | Pilossof |
| 2002/0024711 A1 | 2/2002 | Miles |
| 2002/0027636 A1 | 3/2002 | Yamada |
| 2002/0054424 A1 | 5/2002 | Miles |
| 2002/0070931 A1 | 6/2002 | Ishikawa |
| 2002/0075555 A1 | 6/2002 | Miles |
| 2002/0114558 A1 | 8/2002 | Nemirovsky |
| 2002/0126364 A1 | 9/2002 | Miles |
| 2002/0139981 A1 | 10/2002 | Young |
| 2002/0146200 A1 | 10/2002 | Kurdle et al. |
| 2002/0149828 A1 | 10/2002 | Miles |
| 2002/0149834 A1 | 10/2002 | Mei et al. |
| 2002/0149850 A1 | 10/2002 | Heffner et al. |
| 2002/0154422 A1 | 10/2002 | Sniegowski et al. |
| 2002/0167072 A1 | 11/2002 | Andosca |
| 2002/0167730 A1 * | 11/2002 | Needham et al. ............. 359/578 |
| 2002/0186483 A1 | 12/2002 | Hagelin et al. |
| 2002/0197761 A1 | 12/2002 | Patel et al. |
| 2003/0015936 A1 | 1/2003 | Yoon et al. |
| 2003/0016428 A1 | 1/2003 | Kato et al. |
| 2003/0029705 A1 | 2/2003 | Qui et al. |
| 2003/0035196 A1 | 2/2003 | Walker |
| 2003/0043157 A1 | 3/2003 | Miles |
| 2003/0053078 A1 | 3/2003 | Missey et al. |
| 2003/0072070 A1 | 4/2003 | Miles |
| 2003/0119221 A1 | 6/2003 | Cunningham et al. |
| 2003/0123125 A1 | 7/2003 | Little |
| 2003/0138669 A1 | 7/2003 | Kojima et al. |
| 2003/0156315 A1 | 8/2003 | Li et al. |
| 2003/0202264 A1 | 10/2003 | Weber et al. |
| 2003/0202265 A1 | 10/2003 | Reboa et al. |
| 2003/0202266 A1 | 10/2003 | Ring et al. |
| 2003/0210851 A1 | 11/2003 | Fu et al. |
| 2004/0008396 A1 | 1/2004 | Stappaerts |
| 2004/0008438 A1 * | 1/2004 | Sato ............................... 359/890 |
| 2004/0027671 A1 | 2/2004 | Wu et al. |
| 2004/0027701 A1 * | 2/2004 | Ishikawa ....................... 359/883 |
| 2004/0043552 A1 | 3/2004 | Strumpell et al. |
| 2004/0051929 A1 | 3/2004 | Sampsell et al. |
| 2004/0056742 A1 | 3/2004 | Dabbaj |
| 2004/0058532 A1 | 3/2004 | Miles et al. |
| 2004/0075967 A1 | 4/2004 | Lynch et al. |
| 2004/0076802 A1 | 4/2004 | Tompkin et al. |
| 2004/0080035 A1 | 4/2004 | Delapierre |
| 2004/0080807 A1 | 4/2004 | Chen et al. |
| 2004/0100594 A1 | 5/2004 | Huibers et al. |
| 2004/0100677 A1 | 5/2004 | Huibers et al. |
| 2004/0100680 A1 | 5/2004 | Huibers et al. |
| 2004/0124483 A1 | 7/2004 | Partridge et al. |
| 2004/0125281 A1 | 7/2004 | Lin et al. |
| 2004/0125282 A1 | 7/2004 | Lin et al. |
| 2004/0125347 A1 | 7/2004 | Patel et al. |
| 2004/0136045 A1 | 7/2004 | Tran |
| 2004/0140557 A1 | 7/2004 | Sun et al. |
| 2004/0145049 A1 | 7/2004 | McKinnell et al. |
| 2004/0145811 A1 | 7/2004 | Lin et al. |
| 2004/0147056 A1 | 7/2004 | McKinnell et al. |
| 2004/0147198 A1 | 7/2004 | Lin et al. |
| 2004/0148009 A1 | 7/2004 | Buzzard et al. |
| 2004/0150939 A1 | 8/2004 | Huff |
| 2004/0160143 A1 | 8/2004 | Shreeve et al. |
| 2004/0174583 A1 | 9/2004 | Chen et al. |
| 2004/0175577 A1 | 9/2004 | Lin et al. |
| 2004/0179281 A1 | 9/2004 | Reboa |
| 2004/0179445 A1 | 9/2004 | Park et al. |
| 2004/0184134 A1 | 9/2004 | Makigaki |
| 2004/0184766 A1 | 9/2004 | Kim et al. |
| 2004/0188599 A1 | 9/2004 | Viktorovitch et al. |
| 2004/0201908 A1 | 10/2004 | Kaneko |
| 2004/0207897 A1 | 10/2004 | Lin |
| 2004/0209192 A1 | 10/2004 | Lin et al. |
| 2004/0209195 A1 | 10/2004 | Lin |
| 2004/0212026 A1 | 10/2004 | Van Brooklin et al. |
| 2004/0217378 A1 | 11/2004 | Martin et al. |
| 2004/0217919 A1 | 11/2004 | Pichi et al. |
| 2004/0218251 A1 | 11/2004 | Piehl et al. |
| 2004/0218334 A1 | 11/2004 | Martin et al. |
| 2004/0218341 A1 | 11/2004 | Martin et al. |
| 2004/0227493 A1 | 11/2004 | Van Brocklin et al. |
| 2004/0233503 A1 | 11/2004 | Kimura |
| 2004/0240032 A1 | 12/2004 | Miles |
| 2004/0240138 A1 | 12/2004 | Martin et al. |
| 2004/0245588 A1 | 12/2004 | Nikkel et al. |
| 2004/0259010 A1 | 12/2004 | Kanbe |
| 2004/0263944 A1 | 12/2004 | Miles et al. |
| 2005/0001828 A1 | 1/2005 | Martin et al. |
| 2005/0002082 A1 | 1/2005 | Miles |
| 2005/0003667 A1 | 1/2005 | Lin et al. |
| 2005/0014374 A1 | 1/2005 | Partridge et al. |
| 2005/0024557 A1 | 2/2005 | Lin |
| 2005/0035699 A1 | 2/2005 | Tsai |
| 2005/0036095 A1 | 2/2005 | Yeh et al. |
| 2005/0036192 A1 | 2/2005 | Lin et al. |
| 2005/0038950 A1 | 2/2005 | Adelmann |
| 2005/0042117 A1 | 2/2005 | Lin |
| 2005/0046919 A1 | 3/2005 | Taguchi et al. |
| 2005/0046922 A1 | 3/2005 | Lin et al. |
| 2005/0046948 A1 | 3/2005 | Lin |
| 2005/0057442 A1 | 3/2005 | Way |
| 2005/0068583 A1 | 3/2005 | Gutkowski et al. |
| 2005/0068605 A1 | 3/2005 | Tsai |
| 2005/0068606 A1 | 3/2005 | Tsai |
| 2005/0068627 A1 | 3/2005 | Nakamura et al. |
| 2005/0069209 A1 | 3/2005 | Damera-Vankata et al. |
| 2005/0078348 A1 | 4/2005 | Lin |

| | | | |
|---|---|---|---|
| 2005/0117623 A1 | 6/2005 | Shchukin et al. | |
| 2005/0157364 A1 | 7/2005 | Lin | |
| 2005/0168849 A1 | 8/2005 | Lin | |
| 2005/0179378 A1 | 8/2005 | Oooka et al. | |
| 2005/0195462 A1 | 9/2005 | Lin | |
| 2005/0195467 A1 | 9/2005 | Kothari et al. | |
| 2005/0202649 A1 | 9/2005 | Hung et al. | |
| 2005/0249966 A1 | 11/2005 | Tung et al. | |
| 2005/0275930 A1 | 12/2005 | Patel et al. | |
| 2006/0007517 A1 | 1/2006 | Tsai | |
| 2006/0017689 A1 | 1/2006 | Faase et al. | |
| 2006/0044654 A1 | 3/2006 | Vandorpe et al. | |
| 2006/0065940 A1 | 3/2006 | Kothari et al. | |
| 2006/0066599 A1 | 3/2006 | Chui et al. | |
| 2006/0066640 A1 | 3/2006 | Kothari et al. | |
| 2006/0066935 A1 | 3/2006 | Cummings et al. | |
| 2006/0066936 A1 | 3/2006 | Chui et al. | |
| 2006/0067645 A1 | 3/2006 | Gally et al. | |
| 2006/0077152 A1 | 4/2006 | Chui et al. | |
| 2006/0077155 A1 | 4/2006 | Chui et al. | |
| 2006/0077507 A1 | 4/2006 | Chui et al. | |
| 2006/0077508 A1 | 4/2006 | Chui et al. | |
| 2006/0077515 A1 | 4/2006 | Cummings et al. | |
| 2006/0077516 A1 | 4/2006 | Kothari | |
| 2006/0077520 A1 | 4/2006 | Chui et al. | |
| 2006/0077533 A1 | 4/2006 | Miles et al. | |
| 2006/0079048 A1 | 4/2006 | Sampsell | |
| 2006/0082863 A1 | 4/2006 | Piehl et al. | |
| 2006/0139723 A9 | 6/2006 | Miles | |
| 2006/0220160 A1 | 10/2006 | Miles | |
| 2006/0262126 A1 | 11/2006 | Miles | |
| 2006/0262380 A1 | 11/2006 | Miles | |
| 2006/0268388 A1 | 11/2006 | Miles | |
| 2006/0274074 A1 | 12/2006 | Miles | |
| 2007/0020948 A1 | 1/2007 | Piehl et al. | |
| 2007/0153860 A1 | 7/2007 | Chang-Hasnain et al. | |
| 2007/0177247 A1 | 8/2007 | Miles | |
| 2007/0253054 A1 | 11/2007 | Miles | |
| 2008/0037093 A1 | 2/2008 | Miles | |
| 2008/0088904 A1 | 4/2008 | Miles | |
| 2008/0088910 A1 | 4/2008 | Miles | |
| 2008/0088911 A1 | 4/2008 | Miles | |
| 2008/0088912 A1 | 4/2008 | Miles | |
| 2008/0106782 A1 | 5/2008 | Miles | |
| 2008/0297880 A1 | 12/2008 | Steckl et al. | |
| 2009/0068781 A1 | 3/2009 | Tung et al. | |
| 2009/0080060 A1 | 3/2009 | Sampsell et al. | |
| 2010/0039370 A1 | 2/2010 | Miles | |

FOREIGN PATENT DOCUMENTS

| | | |
|---|---|---|
| DE | 10228946 A1 | 1/2004 |
| EP | 0 310 176 A2 | 4/1989 |
| EP | 0 361 981 | 4/1990 |
| EP | 0 667 548 A1 | 8/1995 |
| EP | 0 668 490 | 8/1995 |
| EP | 0 788 005 | 8/1997 |
| EP | 1 122 577 | 8/2001 |
| EP | 1 227 346 | 7/2002 |
| EP | 1275997 | 1/2003 |
| EP | 1 403 212 | 3/2004 |
| EP | 1 435 336 | 7/2004 |
| EP | 1 473 691 A | 11/2004 |
| EP | 1473581 A2 | 11/2004 |
| EP | 1484635 | 12/2004 |
| FR | 2 824 643 A | 11/2002 |
| JP | 62 082454 | 4/1987 |
| JP | 5-49238 | 2/1993 |
| JP | 5-281479 | 10/1993 |
| JP | 05275401 A1 | 10/1993 |
| JP | 9-127439 | 5/1997 |
| JP | 11211999 | 8/1999 |
| JP | 11211999 A | 11/1999 |
| JP | 2000306515 A | 11/2000 |
| JP | 2001-221913 | 8/2001 |
| JP | 2001 249283 | 9/2001 |
| JP | 2002-062490 | 2/2002 |
| JP | 2002-221678 | 8/2002 |
| JP | 2002277771 A | 9/2002 |
| JP | 2003-340795 | 2/2003 |
| JP | 2003-195201 | 7/2003 |
| JP | 2003195201 A | 7/2003 |
| JP | 2004-012642 | 1/2004 |
| JP | 2004157527 A | 6/2004 |
| JP | 2004-212638 | 7/2004 |
| JP | 2004-212680 | 7/2004 |
| JP | 2004235465 A | 8/2004 |
| JP | 2004286825 A | 10/2004 |
| JP | 2005 279831 | 10/2005 |
| JP | 2005-308871 | 11/2005 |
| NO | 157313 | 5/1991 |
| WO | WO 95/30924 | 11/1995 |
| WO | WO 97/17628 | 5/1997 |
| WO | WO 98/14804 | 4/1998 |
| WO | WO 99/52006 A2 | 10/1999 |
| WO | WO 99/52006 A3 | 10/1999 |
| WO | WO 02/079853 | 10/2002 |
| WO | WO 02/086582 | 10/2002 |
| WO | WO 03/007049 A1 | 1/2003 |
| WO | WO 03/014789 A2 | 2/2003 |
| WO | WO 03/054925 | 7/2003 |
| WO | WO 03/069404 | 8/2003 |
| WO | WO 03/069413 A1 | 8/2003 |
| WO | WO 03/073151 A1 | 9/2003 |
| WO | WO 03/085728 A1 | 10/2003 |
| WO | WO 03/105198 | 12/2003 |
| WO | WO 2004/006003 A1 | 1/2004 |
| WO | WO 2004/026757 A2 | 4/2004 |
| WO | WO 2005/006364 A1 | 1/2005 |
| WO | WO 2006/014929 | 2/2006 |

OTHER PUBLICATIONS

Akasaka, "Three-Dimensional IC Trends", Proceedings of IEEE, vol. 74, No. 12, pp. 1703-1714, (Dec. 1986).

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

Aratani K., et al., "Surface micromachined tuneable interferometer array," Sensors and Actuators, pp. 17-23. (1994).

Bass, "Handbook of Optics, vol. I, Fundamentals, Techniques, and Design, Second Edition," McGraw-Hill, Inc., New York, pp. 2.29-2.36 (1995).

Butler et al., "An Embedded Overlay Concept for Microsystems Packaging," IEEE Transactions on Advanced Packaging IEEE USA, vol. 23, No. 4, pp. 617-622, XP002379648 (2000).

Chiou et al., "A Novel Capacitance Control Design of Tunable Capacitor Using Multiple Electrostatic Driving Electrodes," IEEE NANO 2001, M 3.1, Nanoelectronics and Giga-Scale Systems (Special Session), Oct. 29, 2001, pp. 319-324.

Chunjun Wang et al., "Flexible curcuit-based RF MEMS Switches," MEMS. XP002379649 pp. 757-762, (Nov. 2001).

Conner, "Hybrid Color Display Using Optical Interference Filter Array," SID Digest, pp. 577-580 (1993).

Giles et al., "A Silicon MEMS Optical Switch Attenuator and Its Use in Lightwave Subsystems," IEEE Journal of Selected Topics in Quanum Electronics, vol. 5, No. 1, pp. 18-25, (Jan./Feb. 1999).

Goossen et al., "Possible Display Applications of the Silicon Mechanical Anti-Reflection Switch," Society for Information Display (1994).

Goossen et al., "Silicon Modulator Based on Mechanically-Active Anti-Reflection Layer with 1Mbit/sec Capability for Fiber-in-the-Loop Applications," IEEE Photonics Technology Letters, pp. 1119-1121 (Sep. 1994).

Goossen, "MEMS-based variable optical interference devices," Optical MEMS, 2000 IEEE/LEDS Int'l Conf. on Aug. 21-24, 2000, Piscatawny, NJ, Aug. 21, 2000, pp. 17-18.

Gosch, "West Germany Grabs the Lead in X-Ray Lithography," Electronics pp. 78-80 (Feb. 5, 1987).

Howard et al., "Nanometer-Scale Fabrication Techniques", VLSI Electronics: Microstructure Science, vol. 5, pp. 145-153 and pp. 166-173 (1982).

Ibbotson et al., "Comparison of XeF2 and F-atom reactions with Si and SiO2," Applied Physics Letters, vol. 44, No. 12, pp. 1129-1131 (Jun. 1984).

Jackson "Classical Electrodynamics", John Wiley & Sons Inc., pp. 568-573. (date unknown).

Jerman et al., "A Miniature Fabry-Perot Interferometer with a Corrugated Silicon Diaphragm Support", (1988).

Jerman et al., "Miniature Fabry-Perot Interferometers Micromachined in Silicon for Use in Optical Fiber WDM Systems," Transducers, San Francisco, Jun. 24-27, 1991, Proceedings on the Int'l. Conf. on Solid State Sensors and Actuators, vol. CONF. 6, Jun. 24, 1991, pp. 372-375.

Joannopoulos et al., "Molding the Flow of Light," Photonic Crystals. 1995.

Johnson "Optical Scanners", Microwave Scanning Antennas, vol. 1, p. 251-261, (1964).

Circle 36: Light over Matter, Circle No. 36 (Jun. 1993).

Miles, Mark, W., "A New Reflective FPD Technology Using Interferometric Modulation", The Proceedings of the Society for Information Display (May 11-16, 1997).

Nagami et al., "Plastic Cell Architecture: Towards Reconfigurable Computing for General-Purpose," Proc. IEEE Workshop on FPGA-based Custom Computing Machines, (1998).

Newsbreaks, "Quantum-trench devices might operate at terahertz frequencies", Laser Focus World (May 1993).

Oliner et al., "Radiating Elements and Mutual Coupling", Microwave Scanning Antennas, vol. 2, pp. 131-141, (1966).

Peerlings et al., "Long Resonator Micromachined Tunable GaAs-A1As Fabry-Perot Filter," IEEE Photonics Technology Letters, IEEE Service Center, Piscatawny, NJ, vol. 9, No. 9, Sep. 1997, pp. 1235-1237.

Raley et al., "A Fabry-Perot Microinterferometer for Visible Wavelengths", IEEE Solid-State Sensor and Actuator Workshop, Jun. 1992, Hilton Head, SC.

Schnakenberg, et al. TMAHW Etchants for Silicon Micromachining. 1991 International Conference on Solid State Sensors and Actuators-Digest of Technical Papers. pp. 815-818.

Sperger et al., "High Performance Patterned All-Dielectric Interference Colour Filter for Display Applications", SID Digest, pp. 81-83, (1994).

Stone, "Radiation and Optics, An Introduction to the Classical Theory", McGraw-Hill, pp. 340-343, (1963).

Walker, et al., "Electron-beam-tunable Interference Filter Spatial Light Modulator", Optics Letters vol. 13, No. 5, pp. 345-347, (May 1988).

Williams, et al. Etch Rates for Micromachining Processing. Journal of Microelectromechanical Systems, vol. 5, No. 4, pp. 256-259, (Dec. 1996).

Winters, et al. The etching of silicon with XeF2 vapor. Applied Physics Letters, vol. 34, No. 1, pp. 70-73, (Jan. 1979).

Winton, John M., "A novel way to capture solar energy", Chemical Week, (May 1985).

Wu, "Design of a Reflective Color LCD Using Optical Interference Reflectors", ASIA Display '95, pp. 929-931, (Oct. 1995).

Wu et al., "MEMS Designed for Tunable Capacitors," Microwave Symposium Digest, 1998 IEEE MTT-S Int'l, Baltimore, MD, Jun. 7-12, 1998, vol. 1, pp. 127-129.

Zhou et al., "Waveguide Panel Display Using Electromechanical Spatial Modulators," SID Digest, vol. XXIX, 1998.

International Search Report and Written Opinion of the International Searching Authority for PCT/US2005/005919 dated Aug. 24, 2005.

International Search Report Application No. PCT/US2005/026448, Dated Nov. 23, 2005.

International Search Report Application No. PCT/US2005/029820, Dated Dec. 27, 2005.

International Search Report Application No. PCT/US2005/030962, Dated Aug. 31, 2005.

International Search Report Application No. PCT/US2005/034465, Dated Sep. 23, 2005.

European Search Report Application No. 05255693.3 - 2217, dated May 24, 2006.

European Search Report Application No. EP 05 25 5673 in 9 pages, dated Jan. 23, 2006.

Austrian Search Report No. 162/2005, Dated Jul. 14, 2005.
Austrian Search Report No. 164/2005, Dated Jul. 4, 2005.
Austrian Search Report No. 140/2005, Dated Jul. 15, 2005.
Austrian Search Report No. 161/2005, Dated Jul. 15, 2005.
Austrian Search Report No. 150/2005, Dated Jul. 29, 2005.
Austrian Search Report No. 144/2005, Dated Aug. 11, 2005.
Austrian Search Report No. 66/2005, Dated May 9, 2005.

Fan et al., "Channel Drop Filters in Photonic Crystals,"Optics Express, vol. 3, No. 1, 1998.

Fork, et al., "P-67: Chip on Glass Bonding using StressedMetal™ Technology" Sid 05 Digest, May 24, 2005.

Kim et al., "Control of Optical Transmission Through metals Perforated With Subwave-Length Hole Arrays," Optic Letters, vol. 24, No. 4, Feb. 15, 1999, pp. 256-257.

Lin et al., "Free-Space Michromachined Optical Switches for Optical Networking," IEEE Journal of Selected Topics in Quantum Electronics, vol. 5, No. 1m Jan./Feb. 1999, pp. 4-9.

Little et al., "Vertically Coupled Microring Resonator Channel Dropping Filter," IEEE Photonics Technology Letters, vol. 11, No. 2, 1999.

Magel, "Integrated Optic Devices Using Micromachined Metal Membranes," SPIE vol. 2686, 0-8194-2060-Mar. 1996.

Science and Technology, The Economist, May 22, 1999, pp. 89-90.

Pape et al., Characteristics of the deformable mirror device for optical information processing, Optical Engineering, 22(6):676-681, Nov.-Dec. 1983.

Kowarz et al., Conformal grating electromechanical system (GEMS) for high-speed digital light modulation, Proceedings of the IEEE 15th. Annual International Conference on Micro Electro Mechanical Systems, MEMS 2002, pp. 568-573.

Miles, Interferometric modulation: MOEMS as an enabling technology for high performance reflective displays, Proceedings of SPIE, vol. 4985, pp. 131-139, 2003.

Longhurst, 1963, Chapter IX: Multiple Beam Interferometry, in Geometrical and Physical Optics, pp. 153-157.

Tolansky, 1948, Chapter II: Multiple-Beam Interference, in Multiple-bean Interferometry of Surfaces and Films, Oxford at the Clarendon Press, pp. 8-11.

Nakagawa et al., Feb. 1, 2002, Wide-field-of-view narrow-band spectral filters based on photonic crystal nanocavities, Optics Letters, 27(3):191-193.

* cited by examiner

|  | Column Output Signals | |
|---|---|---|
|  | $+V_{bias}$ | $-V_{bias}$ |
| Row Output Signals    0 | Stable | Stable |
| $+\Delta V$ | Relax | Actuate |
| $-\Delta V$ | Actuate | Relax |

MEMS DEVICE HAVING DEFORMABLE MEMBRANE CHARACTERIZED BY MECHANICAL PERSISTENCE

CROSS-REFERENCE TO RELATED APPLICATIONS

This application claims priority to both (1) U.S. Provisional Application No. 60/613,593, filed Sep. 27, 2004, and (2) U.S. Provisional Application No. 60/613,450, filed Sep. 27, 2004, both of which are incorporated by reference herein in their entirety.

BACKGROUND

1. Field of the Invention

The field of the invention relates to microelectromechanical systems (MEMS).

2. Description of the Related Art

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

In an embodiment, a MEMS device is provided, The MEMS device comprising: a substrate; a first layer, the first layer and the substrate configured to have a first cavity therebetween, the first cavity having a first pressure, the first layer movable with respect to the substrate in response to a voltage applied to at least the first layer; a second layer, the second layer and the first layer configured to have a second cavity therebetween, the second cavity having a second pressure; and a structure in fluid communication with at least one of the first and second cavities, the structure configured to manipulate at least one of the first and second pressures to alter a speed of motion of the first layer.

In another embodiment, a MEMS device is provided, The MEMS device comprising: a substrate; a first layer comprising at least one aperture, the first layer and the substrate configured to have a first cavity therebetween, the first layer movable with respect to the substrate in response to a voltage applied to at least the first layer; and a second layer comprising at least one aperture, the second layer and the first layer configured to have a second cavity therebetween, wherein the first and second cavities are in fluid communication through the at least one aperture of the first layer.

In another embodiment, a method of manufacturing a MEMS device is provided, the method comprising: providing a substrate; providing a first sacrificial layer; forming a first layer comprising at least one aperture, wherein the first sacrificial layer is disposed between the substrate and the first layer; providing a second sacrificial layer, wherein the first layer is disposed between the first sacrificial layer and the second sacrificial layer; and forming a second layer comprising at least one aperture, wherein the second sacrificial layer is disposed between the second layer and the first layer.

In another embodiment, a MEMS device is provided, the MEMS device comprising: means for supporting a MEMS device; means for reflecting light, the supporting means and the reflecting means configured to have a first cavity therebetween, the first cavity having a first pressure; means for enclosing a second cavity, wherein said second cavity is located between said enclosing means and said reflecting means, the second cavity having a second pressure; and means for manipulating at least one of the first and second pressures.

In another embodiment, a MEMS device is provided, the MEMS device comprising: means for supporting a MEMS device; means for conducting electricity, the conducting means comprising at least one aperture, the conducting means configured to be movable with respect to the supporting means in response to a voltage applied to at least the conducting means, the supporting means and the conducting means configured to have a first cavity therebetween; and means for dampening movement of the conducting means, the dampening means comprising at least one aperture, the conducting means and the dampening means configured to have a second cavity therebetween.

DETAILED DESCRIPTION OF THE PREFERRED EMBODIMENTS

Figure 1:
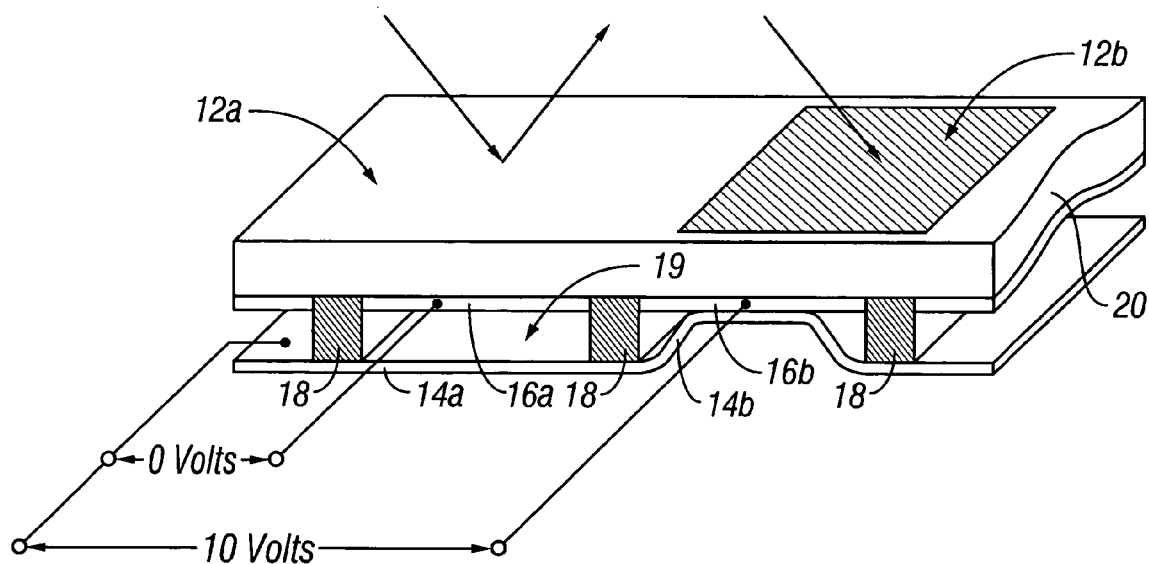
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

A deformable mechanical membrane (or layer) useful to form a display device is provided, wherein the membrane has a faster deformation time constant on actuation than relaxation time constant upon release from actuation. This improves the mechanical persistence of the actuated state of the membrane, which is desirable in some display embodiments. In some embodiments, apertures are formed in the membrane to decrease pressure, including liquid and/or gas pressures, on the membrane when actuated. In other embodiments, a dampening layer is disposed in close proximity to the membrane to apply greater pressure on the membrane in the direction towards the actuated position, thereby slowing the motion of the membrane when released from an actuated state. Other embodiments comprise structures, such as a heating element or vacuum device, to manipulate pressures above and/or below the mechanical membrane to affect the mechanical persistence of the display device. In an exemplary embodiment, a mechanical membrane is disposed between a back plate and a substrate. In some embodiments, the term "below" refers to the direction from the mechanical membrane towards the substrate and the term "above" refers to the direction from the mechanical membrane towards the back plate. Also, in some embodiments, a direction towards the actuated position is the same as a direction from the mechanical membrane towards the substrate and a direction towards the released position is the same as a direction from the mechanical membrane towards the back plate.

As used herein, the term layer is to be given its broadest ordinary meaning. Moreover, a layer may comprise several additional sublayers and is not limited to homogeneous substances of a thin uniform thickness. Although many of the layers are depicted as having a relatively thin sheetlike expanse or region lying over or under another, a layer as used herein may comprise a shorter expanse or region or multiple expanses or regions.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
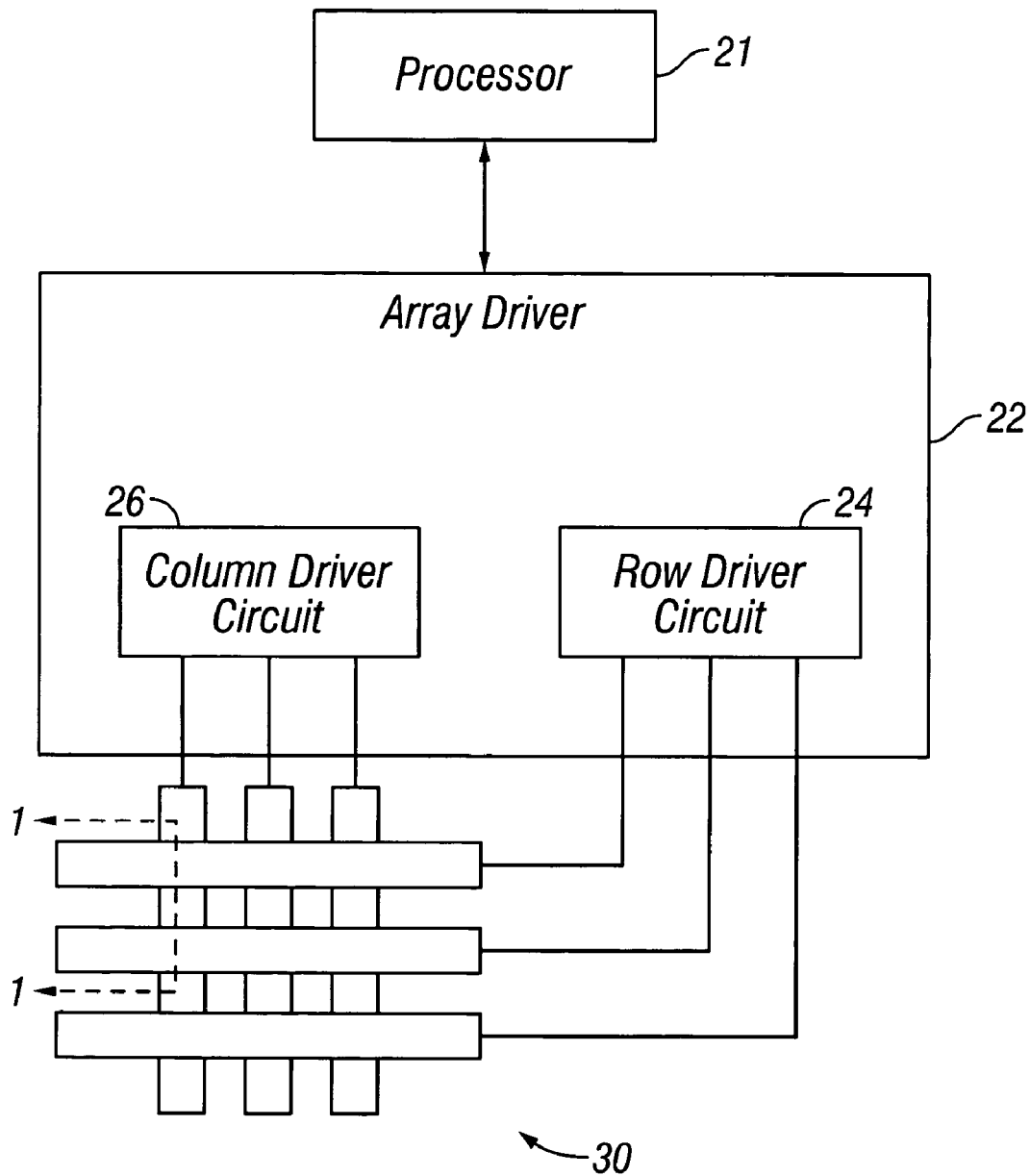
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a panel or display array (display) 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
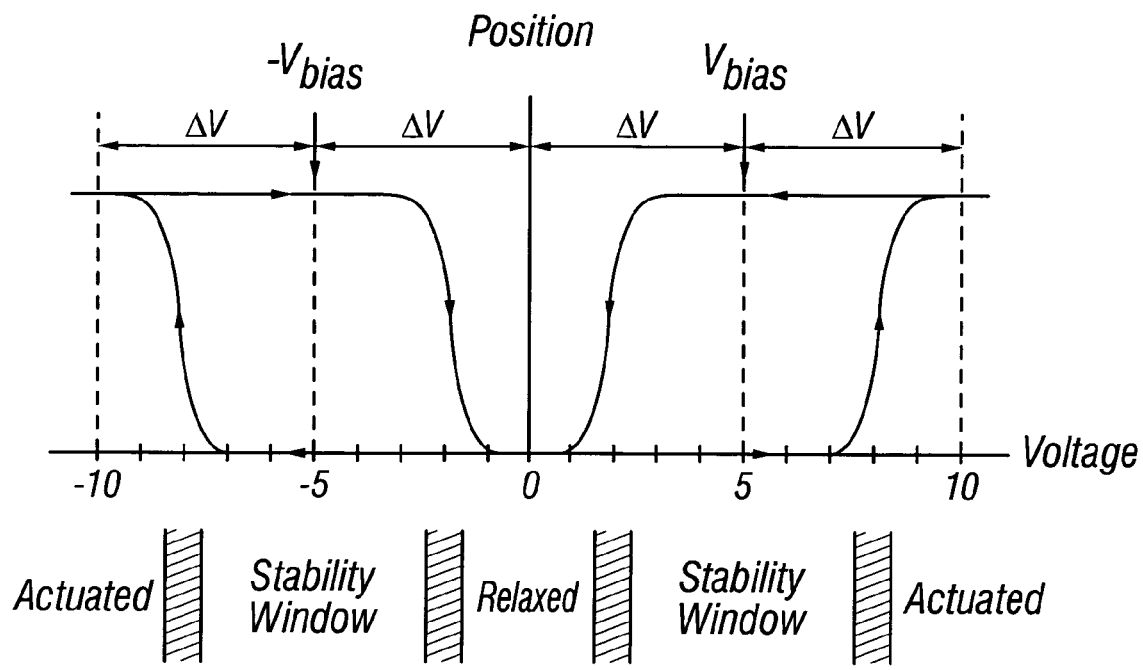
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to −Vbias, and the appropriate row to +ΔV, which may correspond to −5 volts and +5 volts respectively Relaxing the pixel is accomplished by setting the appropriate column to +Vbias, and the appropriate row to the same +ΔV, producing a zero volt potential difference across the pixel. In those rows where the row voltage is held at zero volts, the pixels are stable in whatever state they were originally in, regardless of whether the column is at +Vbias, or −Vbias. As is also illustrated in FIG. 4, it will be appreciated that voltages of opposite polarity than those described above can be used, e.g., actuating a pixel can involve setting the appropriate column to +Vbias, and the appropriate row to −ΔV. In this embodiment, releasing the pixel is accomplished by setting the appropriate column to −Vbias, and the appropriate row to the same −ΔV, producing a zero volt potential difference across the pixel.

Figure 5A:
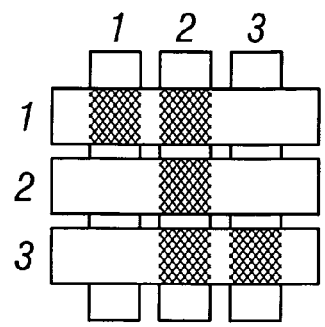
FIGS. 5A and 5B illustrate one exemplary timing diagram for row and column signals that may be used to write a frame of display data to the 3×3 interferometric modulator display of FIG. 2.
Figure 5B:
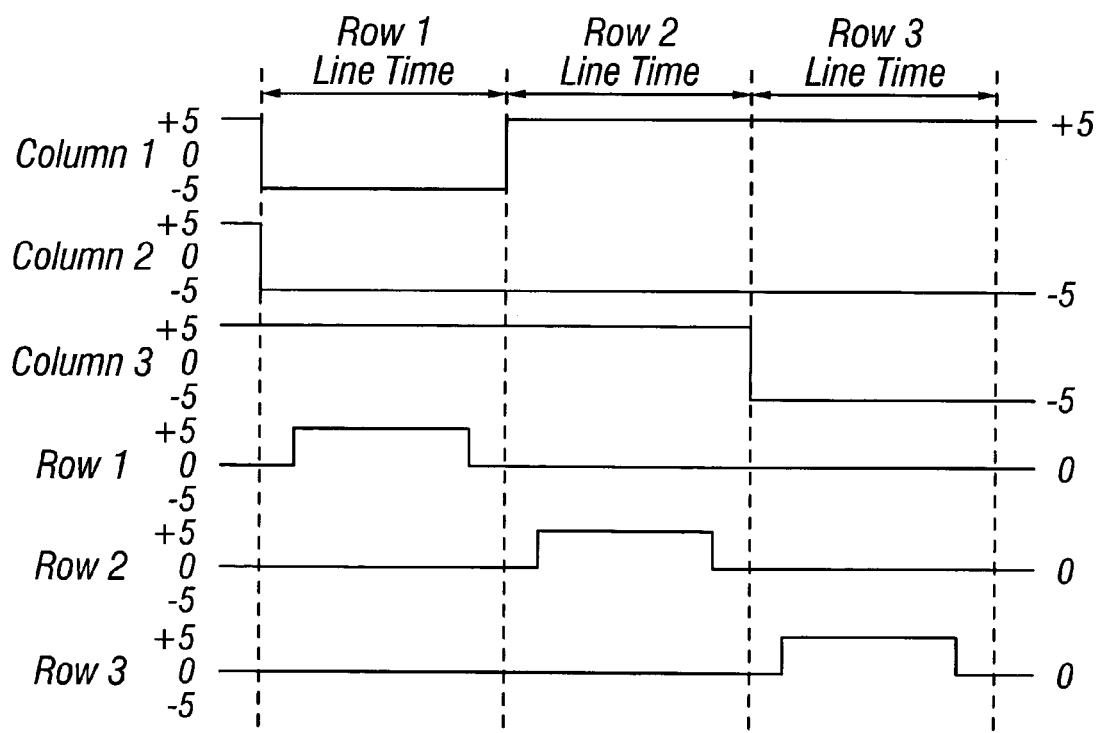

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
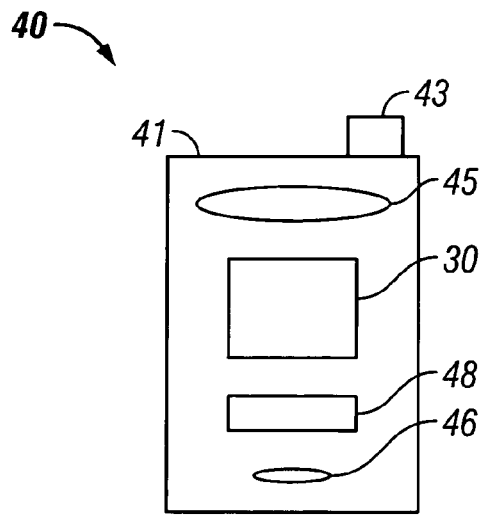
FIGS. 6A and 6B are system block diagrams illustrating an embodiment of a visual display device comprising a plurality of interferometric modulators.
Figure 6B:
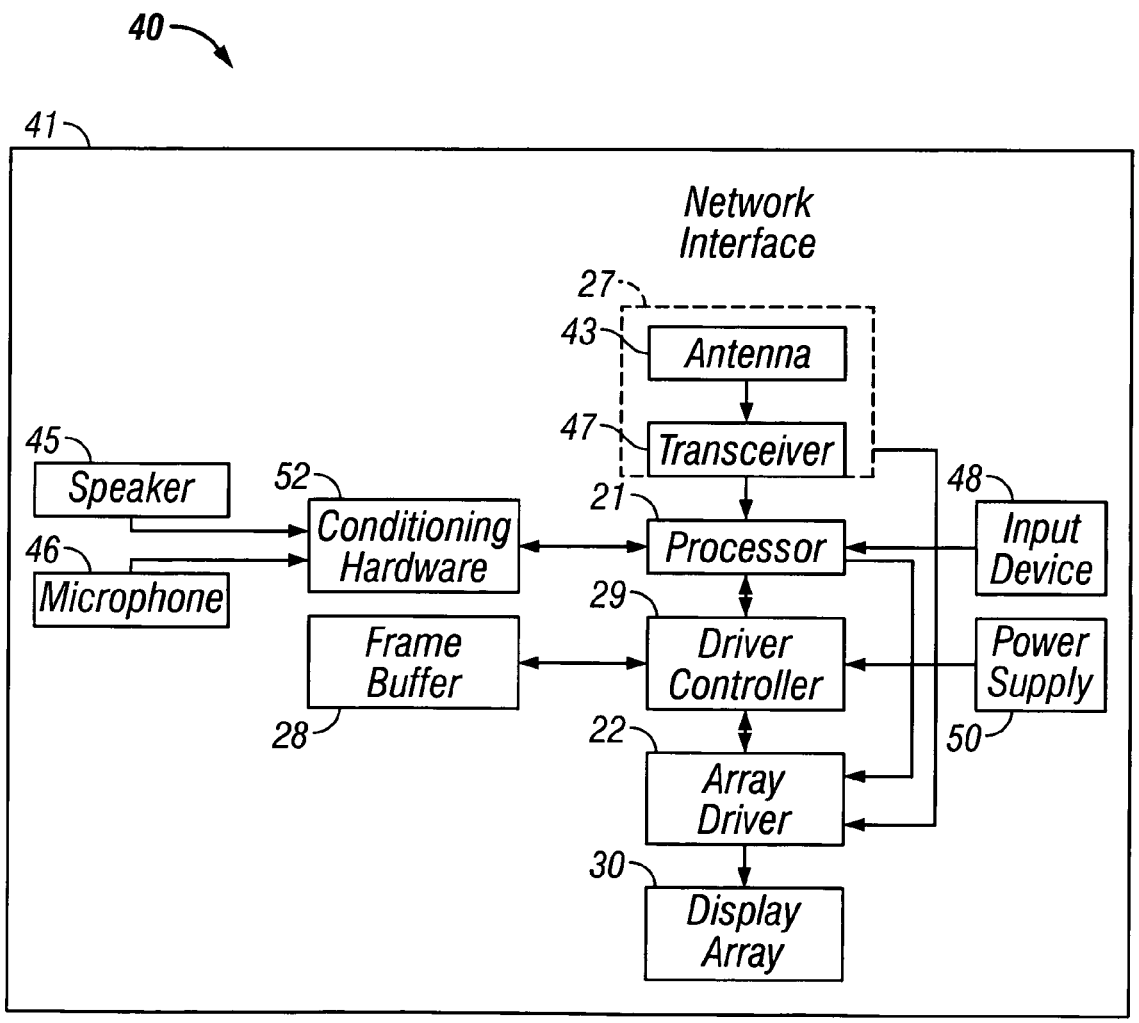

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to the processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28 and to the array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22.

Those of skill in the art will recognize that the above-described optimization may be implemented in any number of hardware and/or software components and in various configurations.

Figure 7A:
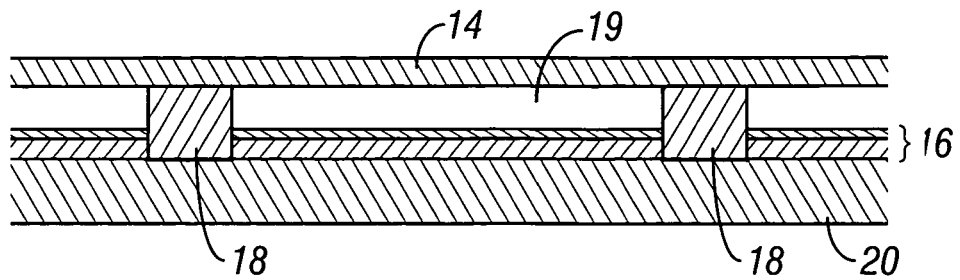
FIG. 7A is a cross section of the device of FIG. 1.
Figure 7B:
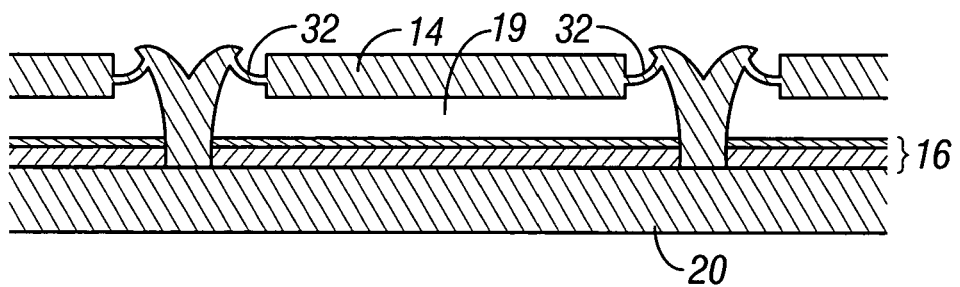
FIG. 7B is a cross section of an alternative embodiment of an interferometric modulator.
Figure 7C:
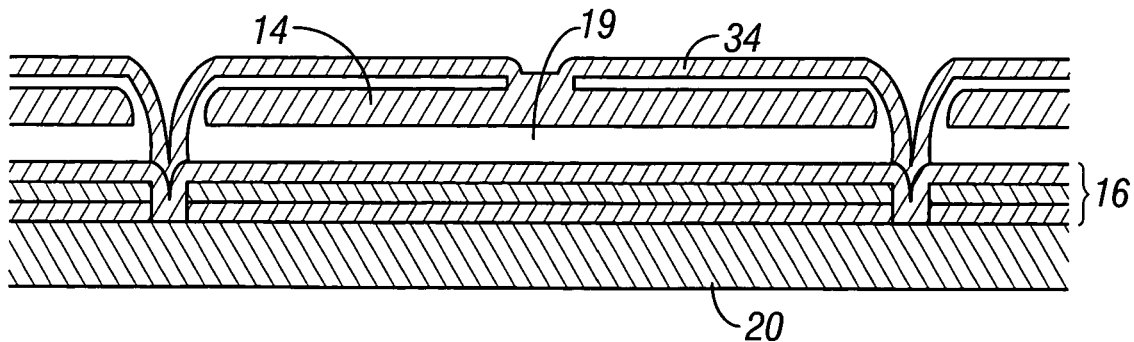
FIG. 7C is a cross section of another alternative embodiment of an interferometric modulator.
Figure 7D:
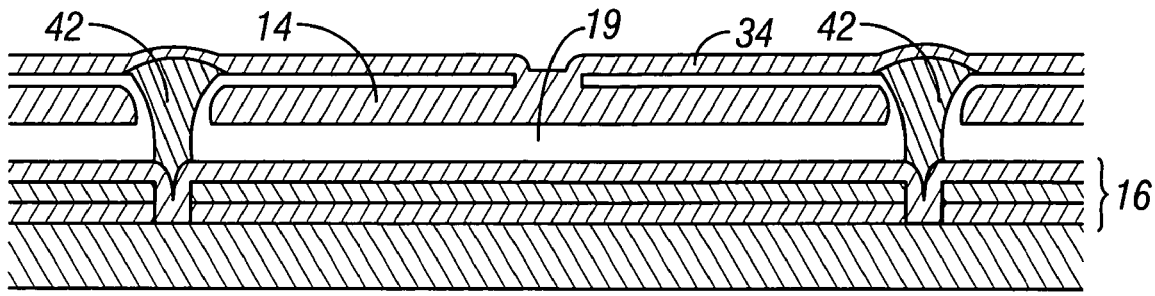
FIG. 7D is a cross section of yet another alternative embodiment of an interferometric modulator.
Figure 7E:
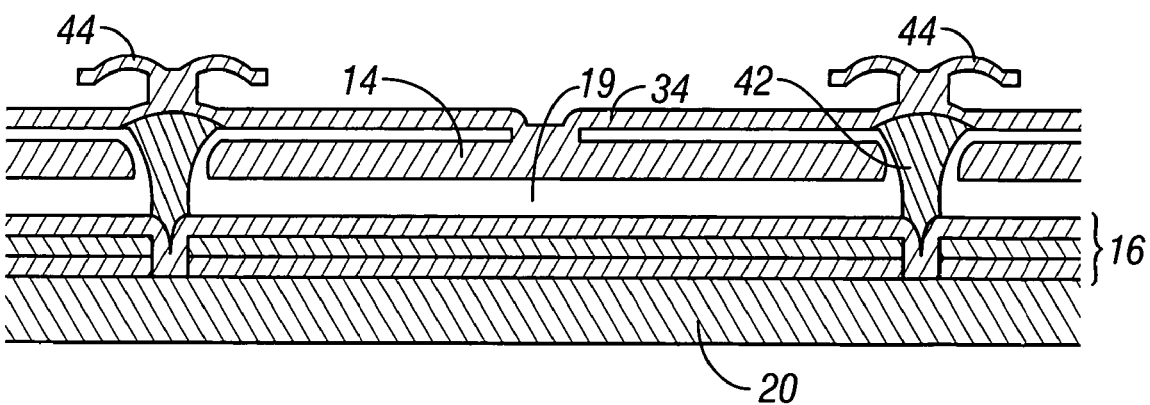
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures, wherein each embodiment comprises a modulator cavity 19. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields some portions of the interferometric modulator on the side of the reflective layer opposite the substrate 20, including the deformable layer 34 and the bus structure 44. This allows the shielded areas to be configured and operated upon without negatively affecting the image quality. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

In some embodiments of display devices made from this modulator design, it is desirable for the moveable layer to transition from the unactuated/relaxed state to the actuated/deformed state very quickly. At the same time, it can be advantageous for the opposite transition back to the relaxed state to occur slowly, even when no voltage is present across the electrodes of a given pixel. This can be referred to as mechanical persistence, whereby the moveable layer will deform quickly in response to a voltage pulse across the electrodes, but will remain in the deformed state for a while after the pulse is over and the voltage returns to zero. In some display embodiments, this mechanical persistence makes the formed image persist for the time necessary to sequentially actuate all the rows of the display, at which point a "refresh" can be performed before the image decays due to relaxation of the individual modulators. In addition, if a set of moveable layers in a display are not fully relaxed between image refresh cycles, a refresh or update can be performed faster and with less energy since the set of moveable layers are already at least partially actuated when the refresh/update is performed.

Stable operation of the MEMS interferometric modulator is achieved by selecting mechanical design features of the interferometric modulator that optimize the actuation and release times for the particular row/column actuation protocol. Described herein are certain structures and methods of making interferometric modulators having varying release and actuation times. In general, the mechanical persistence of the movable layer may be changed by manipulating forces acting upon the movable layer, such as a differential gas pressure, a differential liquid pressure, or a combination of liquid and gas pressures. Typically, the pressure acting upon the movable layer will be from a gas occupying a space above and/or below the movable layer. Accordingly, in some embodiments the pressure(s) exerted on the movable layer is a gas, such as air. In other embodiments, the gas may be any gas suitable for use in an interferometric modulator. In other embodiments, a liquid may occupy the space above and/or below the movable layer. Accordingly, in some embodiments the pressure(s) exerted on the movable layer is a liquid, such as liquids typically used in LCD displays or any other liquid suitable for use in displays. A differential pressure that acts in a direction towards the actuated position will decrease actuation time and increase release time. Conversely, a differential pressure that acts in a direction towards the opposite of the actuated position will increase actuation time and decrease release time.

Manipulation of the mechanical persistence of the movable layer allows an interferometric modulator to be operated without using the hysteresis property of the modulator (illustrated in FIGS. 3 through 5). Instead, the processes and systems described herein may be used with row/column actuation protocols which maintain voltages to the MEMS interferometric modulators that are above or below the "hysteresis window" or "stability window." These protocols may advantageously operate the MEMS interferometric modulator at lower voltages than the voltages employed with the processes and systems described with reference to FIGS. 3 through 5. Examples of such actuation protocols are described in U.S. patent application Ser. No. 11/112,487, entitled "Device and Method for Display Memory Using Manipulation of Mechanical Response," filed Apr. 22, 2005, incorporated by reference herein in its entirety.

The mechanical persistence of the movable layer may be changed by manipulating a differential pressure acting upon the movable layer. Such a differential pressure may be pressure exerted on the movable layer from gas and/or liquid. A differential pressure that acts in a direction of the actuated position will decrease actuation time and increase release time. Conversely, a differential pressure that acts in a direction opposite of the actuated position will increase actuation time and decrease release time. FIGS. 8 through 14 illustrate such methods and structures for manipulating the mechanical persistence of the movable layer of an interferometric modulator. Although many of the protocols, methods, and apparatus described herein reference gas pressures, these same protocols, methods, and apparatus may be used with pressure(s) created by liquids or a combination of gas and liquid.

Figure 8A:
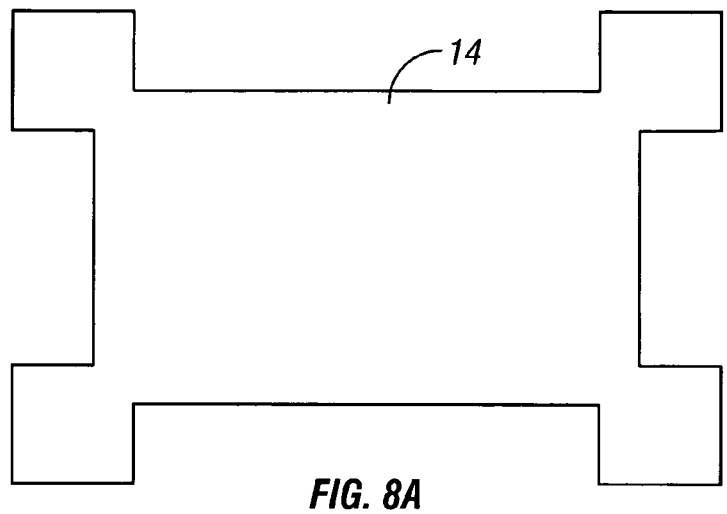
FIGS. 8A, 8B, and 8C illustrate geometric variations in the movable reflective layer that affect the actuation and release times of the modulator so as to improve the operational response of the modulator.
Figure 8B:
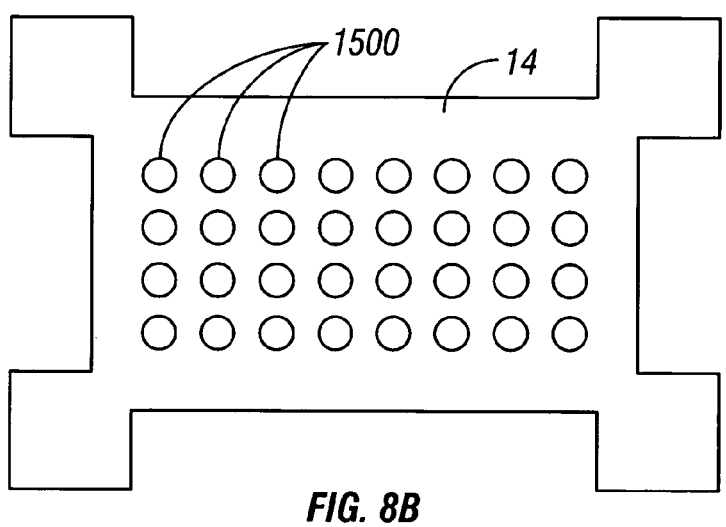
Figure 8C:
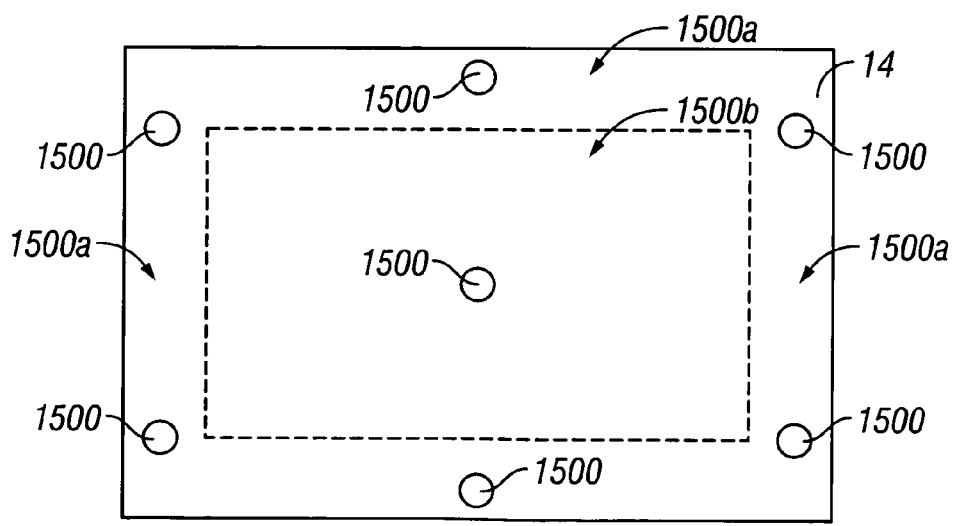

FIGS. 8A through 8C illustrate a geometric variation in the movable layer 14 that affects a gas pressure acting upon the movable layer, thereby affecting actuation and release times of the modulator so as to improve the operational response of the modulator. When the modulator is actuated and the cavity 19 (depicted in FIG. 1 and FIGS. 7A through 7E) is collapsed, gas in the cavity 19, typically air, is forced out of the cavity 19, thereby decreasing a gas pressure within the cavity 19. By perforating the movable layer 14, the gas is allowed to pass out of the cavity 19 through the movable layer 14, resulting in a decrease in the actuation time. In FIG. 8A a solid movable layer 14 is illustrated. In FIG. 8B, the movable layer 14 includes one or more perforations 1500 (also referred to as apertures or holes) so as to decrease the actuation time of the modulator. This will also increase the release time, however, because the gas pressure that would have built up beneath the collapsed movable layer 14 has been discharged. In other embodiments, the cavity 19 is filled with a liquid and the one or more perforations 1500 in the movable layer 14 similarly function to change the actuation and release time of the modulator.

As illustrated in FIG. 8C, the perforations 1500 may be located anywhere on the movable layer 14, including an edge portion 1500a on a periphery of the movable layer 14 and including an inside portion 1500b of the movable layer 14. As used herein, the terms hole or perforation are to be given their broadest ordinary meaning. Moreover, the perforations 1500 (or holes) may be of any size or pattern, including but not limited to rectangular and/or circular shapes that are scattered and/or in an ordered array.

Figure 9:
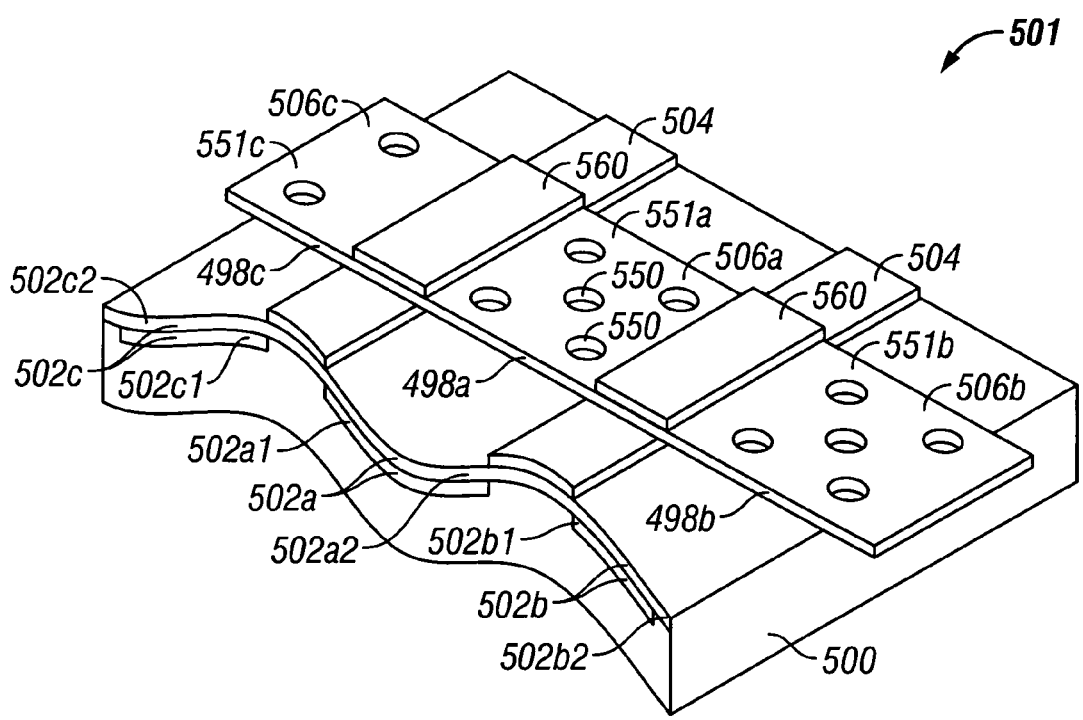
FIG. 9 is a partial perspective view of a modulator that includes holes in the movable layer.
Figure 10A:
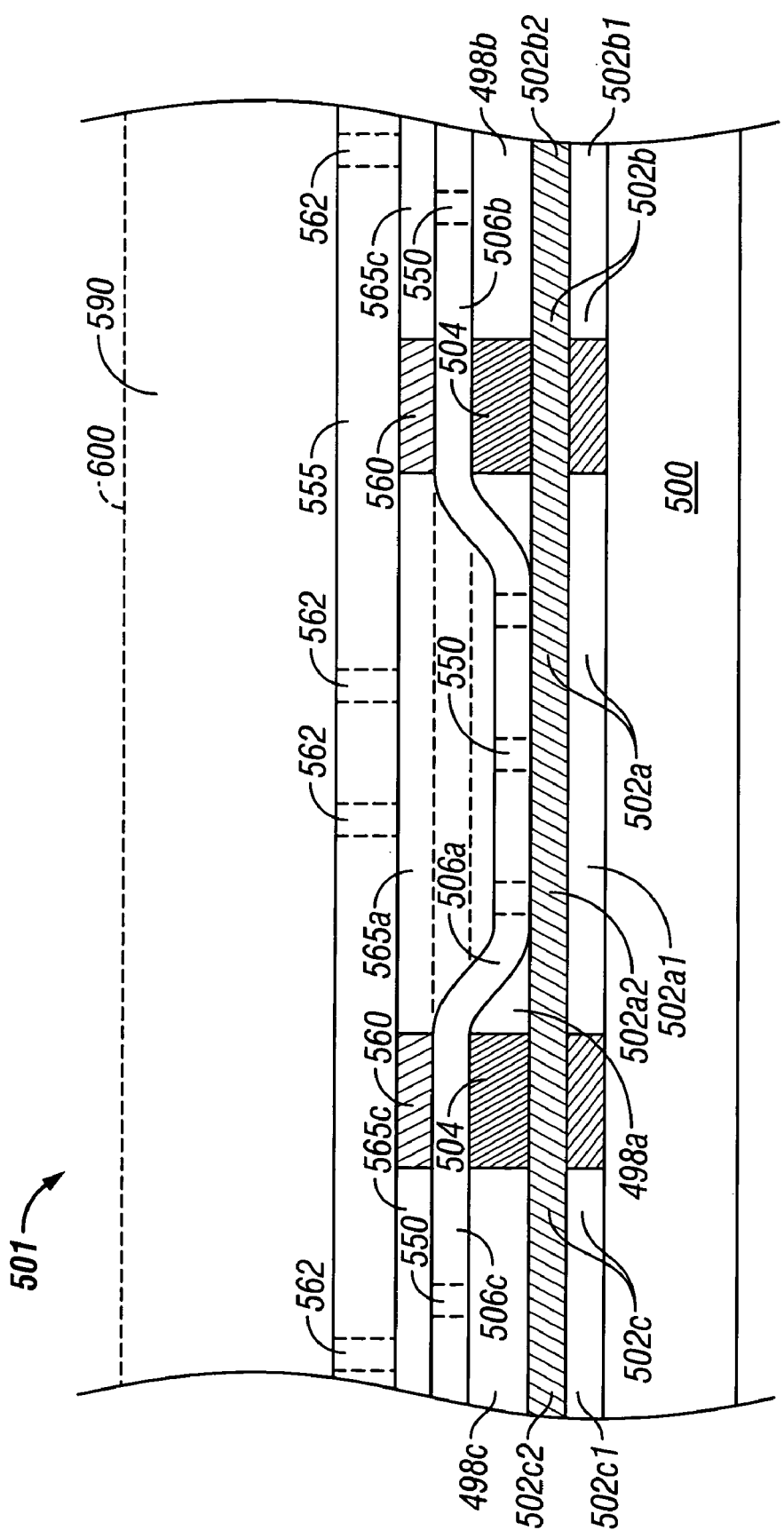
FIG. 10A is a cross sectional view of a modulator that includes holes in the movable layer and additionally includes an upper air flow control layer (otherwise called a dampening layer) that can function to increase the mechanical persistence of the actuated state.
Figure 10B:
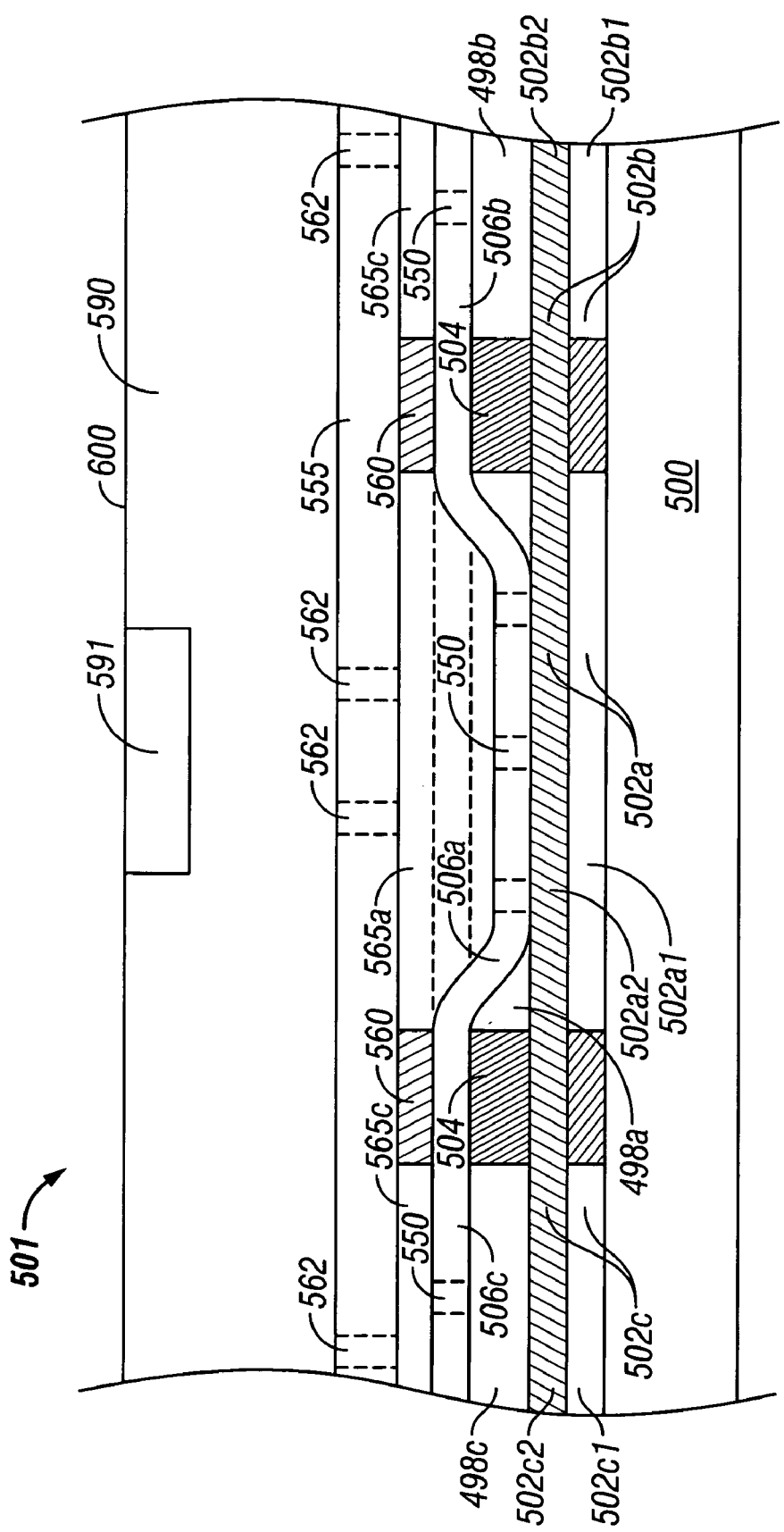
FIG. 10B is a cross sectional view of the modulator of FIG. 10A additionally including a structure configured to control one or more pressures in the modulator.

FIGS. 9, 10A, 10B, and 10C illustrate embodiments of an interferometric modulator that exhibits a relatively high degree of mechanical persistence, wherein the actuation time of the modulator is decreased and the release time of the modulator is increased as compared to the modulator illustrated in FIGS. 1 and 7A-E. Referring to FIGS. 9, 10A and 10B, an interferometric modulator 501 includes an array of cavities 498a, 498b, 498c fabricated on a substrate 500. As described below, the cavities 498a, 498b, 498c are filled with a gas, such as air. However, in other embodiments, the cavities 498a, 498b, 498c may be filled with a liquid.

As used herein, the term cavity is to be given its broadest ordinary meaning, including but not limited to a space or hollow area that is surrounded by something such as, but not limited to, one or more layers or structures. As used herein the term substrate is to be given its broadest ordinary meaning, including but not limited to a layer fabricated out of any material at least partially transmissive to light, including but not limited to glass and plastic; the substrate may also be fabricated into a variety of forms, including but not limited to a homogeneous substance of a thin uniform thickness, a non-homogenous substance or non-uniform thickness; the substrate may also have several sublayers, a shorter expanse or region or multiple expanses or regions.

Each cavity 498a, 498b, 498c may be formed by a combination of dielectric and metallic materials forming mirrors on two layers. The first layer 502a, 502b, 502c forming the cavities 498a, 498b, 498c, respectively, is a primary mirror/conductor comprised of a transparent conductive coating upon which a dielectric or metallic mirror has been fabricated. In some embodiments, layers 502a, 502b, 502c may include a lower layer 502a1, 502b1, 502c1, respectively, comprised of indium-tin-oxide (also referred to herein as ITO). In some embodiments, the layers 502a, 502b, 502c may also include an upper layer 502a2, 502b2, 502c2, respectively, comprised of chromium. The ITO functions as an optically transparent electrical conductor, and the chromium functions as a partial reflector. Insulating supports 504 hold up the second layer 506a, 506b, 506c of the cavities 498a, 498b, 498c, respectively. The second layer 506a, 506b, 506c is also referred to as the movable layer and functions as the secondary mirror/conductor. The movable layer 506a, 506b, 506c may comprise aluminum and is flexible. The movable layer 506a, 506b, 506c is also fabricated such that it is under tensile stress and thus parallel to the substrate 500 in the undriven state.

As shown in FIGS. 9, 10A and 10B, the movable layers 506a, 506b, and 506c can include holes 550 in the deforming regions 551a, 551b, 551c, respectively. These holes 550 reduce a gas pressure acting upon the movable layers 506a, 506b, 506c as each movable layer deforms downward through an intervening layer of gas that occupies the respective cavities 498a, 498b, 498c below the movable layers 506a, 506b, 506c. Without the holes 550, the gas occupying cavities 498a, 498b, 498c would exert a pressure on its respective movable layer 506a, 506b, 506c as the movable layer deforms downward. With the holes 550, however, the gas occupying cavities 498a, 498b, 498c is allowed to escape through the holes 550 of the respective movable layer 506a, 506b, 506c that is deforming towards the substrate 500 resulting in a decrease of the actuation time. In alternative embodiments, holes 550 may be formed in one or more of the movable layers 506a, 506b, 506c.

As shown in FIGS. 10A and 10B, to slow down the reverse transition during release of the movable layer 506a, 506b, 506c, an additional layer of material 555 (also referred to as a dampening layer) is deposited over an array on short posts 560 that run perpendicular to the movable layers 506a, 506b, 506c. The layer 555 may be formed out of a variety of materials, including but not limited to metals, dielectric materials, glass, plastic and polymer materials. The layer 555 may be spin coated or deposited using general deposition techniques. The layer 555 may be any suitable thickness, including but not limited to 1000 angstroms to 10 microns.

In one embodiment, the layer 555 forms an upper portion of cavities 565a, 565b, 565c, and the movable layers 506a, 506b, 506c form a lower portion of cavities 565a, 565b, 565c. In alternative embodiments, the layer 555 may be disposed above one or more of the movable layers 506a, 506b, 506c. The holes 550 in the movable layers 506a, 506b, 506c fluidly couple the cavities 498a, 498b, 498c below the movable layers with the cavities 565a, 565b, 565c above the movable layers. A fluid coupling means, at least, that gas, such as air, may pass between the cavities above and below the movable layers 506a, 506b, 506c. In other embodiments, the cavities 565a, 565b, 565c may be filled with a liquid.

In some prior embodiments, the area 565a, 565b, 565c above the movable layers 506a, 506b, 506c, respectively, was covered with a back plate 600 that would reside a relatively large distance away from the movable layers 506a, 506b, 506c. In the embodiment of FIGS. 10A and 10B, the layer 555 is very close to the movable layers 506a, 506b, 506c when the movable layers are in a relaxed state, as illustrated by movable layers 506b and 506c. In some embodiments, the layer 555 is spaced from the unactuated or relaxed movable layers 506b, 506c by a distance between 200 to 2000 angstroms, including but not limited to 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, and 2000 angstroms. The distance between the layer 555 and unactuated movable layers 506b, 506c is a height dimension of the corresponding cavities 565b, 565c. Because of the close proximity of the layer 555 and the movable layers 506a, 506b, 506c, the layer 555 traps gas, such as air, more than the prior embodiments which include only the more distant back plate 600. It will be appreciated that in the embodiments of FIGS. 9, 10A and 10B, the back plate 600 would still be utilized, and would reside over the layer 555 after installation.

In some embodiments, holes 562 in the layer 555 can be formed. These holes 562 may be formed proximate to one or more of the movable layers 506a, 506b, 506c. To maintain the gas and/or liquid flow restriction and gas and/or liquid pressure manipulation provided in part by the layer 555, in some embodiments the holes 562 may be formed in positions that are not aligned with the holes 550 in the movable layers, such as movable layer 506a. In other embodiments, at least a portion or all of the holes 562 and 550 may be aligned. In embodiments where the layer 555 has holes 562, the cavities 498a, 498b, 498c below the movable layers 506a, 506b, 506c are fluidly coupled via the holes 550 with the cavities 565a, 565b, 565c above the movable layers; the cavities 565a, 565b, 565c above the movable layers are also in fluid communication via the holes 562 with a space 590 between the back plate 600 and the layer 555. Thus, with holes 562 and 550, there is fluid communication between the space 590 and the upper cavities 565a, 565b, 565c, and the lower cavities 498a, 498b, 498c. The net result of holes 550, layer 555, and holes 562 is an increase in the ratio of actuation rate to relaxation rate of the interferometric modulator 501 and the movable layer(s). This improves the mechanical persistence of the interferometric modulator 501. Accordingly, the holes 550, layer 555, and holes 562 are each means for manipulating the pressures within the cavities of the interferometric modulator 501.

Referring to FIG. 10B, in some embodiments, a structure 591 is formed in the interferometric modulator 501, where the structure 591 is configured to improve the mechanical persistence of the interferometric modulator 501. As used herein, the term structure is to be given its broadest ordinary meaning, including but not limited to any definite composition.

The structure 591 is also another means for manipulating the pressures within the cavities of the interferometric modulator 501. In some embodiments, the structure may manipulate a first gas pressure within the cavities 498a, 498b, 498c below the movable layers 506a, 506b, 506c, and/or it may manipulate a second gas pressure within the cavities 565a, 565b, 565c above the movable layers 506a, 506b, 506c. In other embodiments, the structure 591 may manipulate a first liquid pressure within the cavities 498a, 498b, 498c below the movable layers 506a, 506b, 506c, and/or it may manipulate a second liquid pressure within the cavities 565a, 565b, 565c above the movable layers 506a, 506b, 506c. In other embodiments, the structure may manipulate a first pressure within the cavities 498a, 498b, 498c below the movable layers 506a, 506b, 506c, and/or it may manipulate a second pressure within the cavities 565a, 565b, 565c above the movable layers 506a, 506b, 506c, where the first or second pressure may be either a gas or liquid pressure. In one embodiment, the structure 591 is formed in the space 590 above the layer 555. In another embodiment, the structure 591 is formed on the back plate 600.

The structure 591 can be any device configured to manipulate pressures within the cavities of the interferometric modulator 501. In some embodiments, the structure 591 is a heating element configured to heat a gas occupying the cavities in fluid communication with the structure 591, which may include cavities 565a, 565b, 565c if holes 562 are present in the layer 555, and may include cavities 498a, 498b, 498c if holes 550 are present in the movable layers 506a, 506b, 506c.

If the holes 562 and 550 are both present, the heating element can be used to simultaneously manipulate the gas pressures within the cavities above and below the movable layers that are in fluid communication with the heating element 591. As used herein the term heating element is to be given its broadest ordinary meaning, including but not limited to a device or component that produces heat.

In some embodiments, the heating element can be located in space 590 and is configured to heat a gas, such as air, in the space 590 and the cavities that are in fluid communication with the space 590. When heated, the pressure of the gas within the cavities increases according to the ideal gas law PV=nRT, where P is a pressure of the gas and T is a temperature of the gas. Thus, in one embodiment, the heating element may be used to slow the release of one or more of the movable layers, such as movable layer 506A. In this embodiment, motion of the movable layer 506a is slowed because the heated gas in the cavity 565a above the movable layer 506a applies an increased pressure on the movable layer 506a in the direction of the substrate 500. The pressure from the heated gas is greater than the pressure that would normally be applied to the movable layer 506a when the gas is not heated by the heating element.

In another embodiment, the heating element can be configured to heat or cool a liquid in the space 590 and the cavities that are in fluid communication with the space 590. When heated, the viscosity of the liquid within the cavities decreases. Viscosity is a measure of the resistance to flow. They become less viscous, therefore, as the temperature increases. The viscosity of water, for example, decreases from 1.77 centipoise at 0° C. to 0.28 centipoise at 100° C. Thus, in one embodiment, the heating element may be used to reduce the release time of one or more of the movable layers, such as movable layer 506A. In this embodiment, motion of the movable layer 506a is increased because the heated liquid in the cavity 565a above the movable layer 506a applies a decreased viscosity resistance on the movable layer 506a in the direction of the substrate 500 when the movable layer 506a moves through the liquid.

In other embodiments, the structure 591 is a heating element that is configured to both increase the speed of motion of one or more of the movable layers during actuation of the movable layer(s) and decrease the speed of motion of the movable layer(s) during release of the movable layer(s). In these embodiments, the one or more movable layers, such as movable layer 506a, does not have apertures 550. Accordingly, the heating element is in fluid communication with the cavities 565a, 565b, 565c through holes 562 in the layer 555. The heating element in space 590 may then heat a gas, such as air, in the space 590 and the cavities 565a, 565b, 565c that are in fluid communication with the space 590, thereby increasing the pressure of the gas and the force applied above the movable layers 506a, 506b, 506c. Due to the increased pressure from the gas pressing on the movable layers in a direction towards the actuated position, the motion of the movable layers will be increased during actuation of the movable layers; likewise, the increased pressure in a direction towards the opposite the actuated position, the motion of the movable layers will be slowed during the release of the movable layers. In other embodiments where only the gas pressure pressing the movable layer towards the actuated position is present, the layer 555 can be absent. In this embodiment, the post 560 may extend from the movable layer 506 to the back plate 600. The structure 591 could then be used to manipulate the gas pressure in the space above the movable element 506, where the space is between the back plate 600 and the movable layer 506.

In other embodiments, the structure 591 is a vacuum device configured to alter pressures within the cavities of the interferometric modulator 501. As used herein the term vacuum device is to be given its broadest ordinary meaning, including but not limited to a device or component configured to manipulate a pressure, such as but not limited to a pump that can remove or inject gas and/or liquid into one or more spaces or cavities. In these embodiments, the vacuum device may be configured and used in a similar manner as the heating element described above. The vacuum device can be used to increase or decrease the pressure applied to the movable layers by changing, for example, a gas pressure within the cavities above and/or below the movable layers. For example, in some embodiments, the one or more movable layers, such as movable layer 506a, does not have apertures 550. Accordingly, the vacuum is in fluid communication with the cavities 565a, 565b, 565c through holes 562 in the layer 555. The vacuum device in space 590 may then pump gas, such as air, in the space 590 and the cavities 565a, 565b, 565c that are in fluid communication with the space 590, thereby increasing the pressure of the gas and the force applied above the movable layers 506a, 506b, 506c. When the gas pressure in the cavity 565a is increased by the vacuum device, the motion of the movable layer 506a will be increased during actuation and the motion of the movable layer 506a will be decreased during release.

In alternative embodiments, one or more of the cavities of the modulator 501, such as cavities 565a, 565b, 565c, are filled with liquid and the vacuum device is configured to pump liquid into or out of the cavities. In these embodiments, the vacuum device is configured to inject or remove liquid within one or more of the cavities surrounding, for example, the movable layer 506a of the modulator 501. In some embodiments, the vacuum device may draw liquid from or place liquid within a reservoir (not depicted). By manipulating the volume of liquid within one or more of the cavities, the vacuum device may increase or decrease the pressure or force exerted on the movable layer 506a.

In various embodiments, the interferometric modulator 501 and the vacuum device can be configured such that the vacuum device manipulates pressures within the cavities above the movable layers simultaneously or independent of the pressures below the movable layers. In some embodiments, the vacuum device is the structure 591 in the space 590 above the layer 555. In one such embodiment, one or more of the movable layers, such as movable layer 506a, does not have apertures 550. Accordingly, the vacuum device is in fluid communication with at least the cavity 565a above the movable layer 506a. The vacuum device in space 590 may then increase the pressure, such as a gas pressure from air or a liquid pressure, in the space 590 and the cavity 565a that is in fluid communication with the space 590, thereby increasing the pressure and the force applied above the movable layer 506a. Due to the increased pressure pressing down on the movable layer 506a, the motion of the movable layer 506a will be increased during actuation and the motion will slow the release of the movable layer 506a. Because the holes 550 are not present in the movable layer 506a, the vacuum device is not in fluid communication with the cavity 498a below the movable layer 506a. Thus, in this embodiment, the vacuum device can manipulate the pressure within the cavity 565a above the movable layer 506a independent of the pressure in the cavity 498a below the movable layer 506a.

In other embodiments, the holes 550 in the movable layers, such as movable layer 506a, are present, as well as the holes 562 in the layer 555 above the movable layer 506a. The vacuum device is therefore in fluid communication with both cavities 565a and 498a above and below the movable layer 506a. Accordingly, the vacuum device can be used to simultaneously manipulate the pressures within the cavities 565a and 498a above and below the movable layer 506a since the cavities are both in fluid communication with the vacuum device.

Figure 10C:
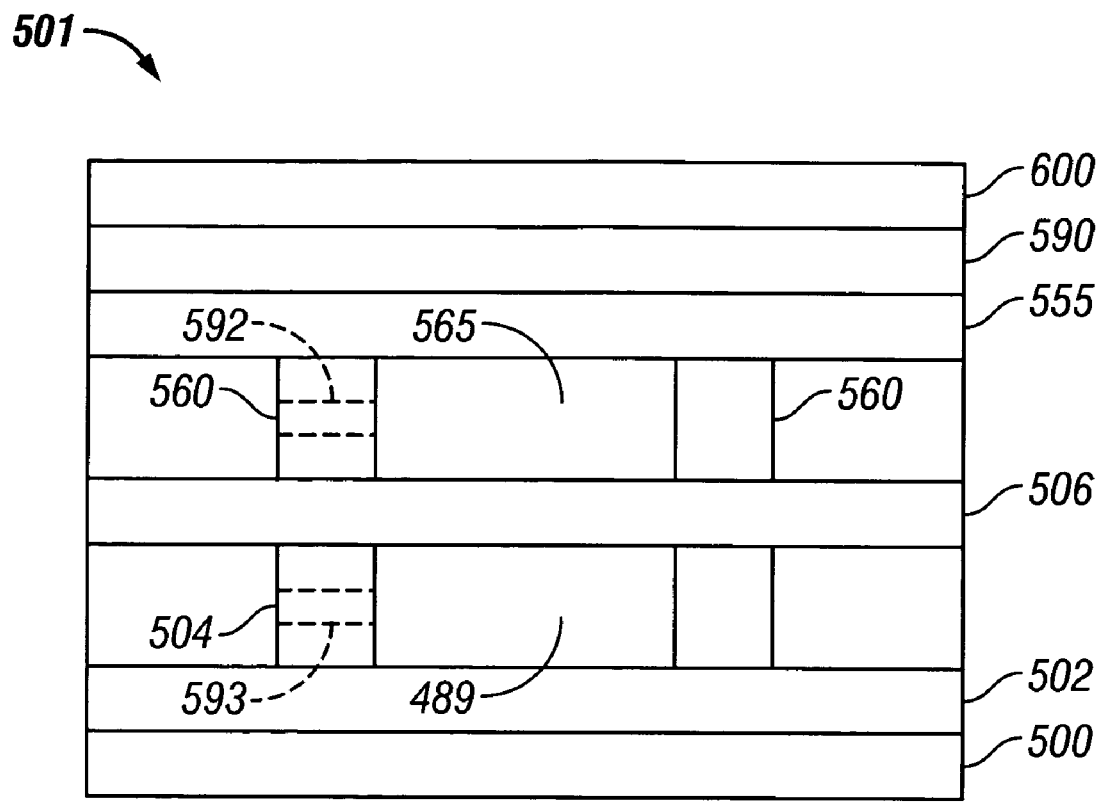
FIG. 10C is a cross sectional view of a modulator that includes holes in one or more structural supports or posts of the modulator.

Referring to FIG. 10C, in alternative embodiments of the interferometric modulator depicted in FIGS. 10A and 10B, one or more of the posts 560 bordering the cavity 565 above the movable layer 506 may be configured with holes 592 and/or one or more of the posts 504 bordering the cavity 498 below the movable layer 506 may be configured with holes 593. In these embodiments, the holes 592 and/or 593 in the posts 560 and/or 504, respectively, can be used in conjunction with a structure that is configured to improve the mechanical persistence of the interferometric modulator 501. The holes 592 and/or 593 are another means for manipulating the pressures, such as a gas pressure from air or a liquid pressure, within the cavities of the interferometric modulator 501. In one embodiment, the movable layer 506 and the layer 555 above the movable layer 506 do not have holes. Rather, the hole 592 in post 560 is in fluid communication with the cavity 565 above the movable layer 506. Using a structure, such as a heating element or vacuum device, in fluid communication with the hole 592, the pressure within the cavity 565 may be manipulated independent of the pressure within the cavity 498 below the movable layer 506. Accordingly, the mechanical persistence of the interferometric modulator 501 and the movable layer 506 is increased when the pressure within the cavity 565 above the movable layer 506 is manipulated by the structure via the hole 592 to be greater than the pressure within the cavity 498 below the movable layer 506. Moreover, in this embodiment, the layer 555 above the movable layer 506 can be absent. In this embodiment, the post 560 may extend from the movable layer 506 to the back plate 600. The hole 592 can then be used in conjunction with a structure, such as a heating element or vacuum device, to manipulate the pressure in the space above the movable element 506, where the space is between the back plate 600 and the movable layer 506.

In an alternative embodiment, the hole 593 can be used to manipulate the pressure within the cavity 498 similar to the embodiments where hole 592 is used to manipulate the pressure within the cavity 565. Using a structure, such as a heating element or vacuum device, in fluid communication with the hole 593, the pressure within the cavity 498 may be manipulated independent of the pressure within the cavity 592 above the movable layer 506. Accordingly, the mechanical persistence of the interferometric modulator 501 and the movable layer 506 is increased when the pressure within the cavity 498 below the movable layer 506 is manipulated by the structure via the hole 593 to be less than the pressure within the cavity 565 above the movable layer 506. Moreover, as in other embodiments discussed previously, the layer 555 above the movable layer 506 can be absent since the pressures within the cavities are manipulated without need for the layer 555.

In other embodiments, the holes 592 and 593 are both present in posts 560 and 504, respectively, such that the pressures within the separate cavities 565 and 498 may be controlled simultaneously and/or independently. In these embodiments, there can be separate structures, such as a heating element or vacuum device, in fluid communication with each of the holes 592 and 593. With a separate structure in fluid communication with each hole(s) 592 and 593, the cavities 565 and 498 may be manipulated to have different pressures. Moreover, in some embodiments, the structure(s) in fluid communication with the hole(s), such as holes 592 and/or 593, may be located at an end of a row of interferometric modulators 501. Thus, a single structure in fluid communication with the hole(s) 592 and/or 593 can manipulate the pressures within the respective cavities of an entire row of an array of interferometric modulators 501, as long as the cavities lined up in the row are in fluid communication with one another through the holes in the post(s) 560 and/or 593 of each interferometric modulator 501.

The structure, layers, and holes in the layers and posts of the interferometric modulator 501, such as layers 502a, 502b, 502c, posts 504, layer 555, layers 506a, 506b, 506c, posts 560, posts 504, holes 562, holes 550, holes 592, or holes 593 can be fabricated using semiconductor manufacturing techniques, such as photolithography, deposition (e.g., "dry" methods such as chemical vapor deposition (CVD) and wet methods such as spin coating), masking, shadow masking, lift-off processing, and etching (e.g., dry methods such as plasma etch and wet methods). Examples of suitable techniques are described in U.S. Pat. No. 6,040,937, filed on Jul. 31, 1996, and U.S. Pat. No. 5,835,255, filed May 5, 1994, both of which are incorporated herein in their entirety.

In some embodiments, the cavities 498a, 498b, 498c are produced by first fabricating a solid set of layers 502a, 502b, 502c, 506a, 506b, 506c, 555 where the cavity areas 498a, 498b, 498c, 565a, 565b, 565c are filled with a sacrificial layer of material such as molybdenum. The thickness of the sacrificial layer is typically selected by taking into consideration the desired color of the modulator in the unactuated position, and by taking into consideration the fabrication process (e.g., dry etch) used to remove the sacrificial layer. In a preferred embodiment, the thickness of the sacrificial layer is in the range of about 400 angstroms to about 6,000 angstroms. For example, in the illustrated embodiment, the sacrificial layer has a thickness of about 2,000 angstroms. An artisan will recognize from the disclosure herein that the sacrificial layer may include, in addition to or instead of molybdenum, one or more other readily removable materials such as silicon (Si), titanium (Ti), tungsten (W), and germanium (G).

After all the layers 502a, 502b, 502c, 506a, 506b, 506c, 555 are deposited, the sacrificial material is removed with a dry etch by exposing the layers to an etch gas. To fabricate the device of FIGS. 9, 10A and 10B, the upper cavities 565a, 565b, 565c are also formed with sacrificial material between the posts 560 during the initial solid state fabrication process. The layer 555 is then fabricated with the holes 562 in order to allow the dry etch gas to contact the sacrificial material originally deposited in cavity areas 565a, 565b, 565c and then down to lower cavities 498a, 498b, 498c.

In other embodiments, a lift-off processing technique is preferably used to form portions of the interferometric modulator, including but not limited to the layers with apertures, such as layers 506a and 555 having apertures 550 and 562 respectively, and/or posts 560 and 504 having holes 592 and 593 respectively. The lift-off is disclosed in U.S. application Ser. No. 11/155,379, entitled "Method of Fabricating Interferometric Devices Using Lift-Off Processing Techniques," filed Jun. 17, 2005, incorporated herein in its entirety. The term "lift-off processing" includes its broad ordinary and customary meaning, including fabrication processes resulting in the definition of a pattern on a substrate surface (without requiring etching of the material to remain in the product), as may be generally used to pattern geometry of hard-to-etch metals such as gold. In lift-off processing, materials are deposited over a patterned underlying material (such as a photoresist) and then lifted off in selected areas by dissolving the underlying material. The patterned underlying material formed during lift-off processing may be referred to herein as a lift-off pattern or as a lift-off stencil.

As discussed in U.S. application Ser. No. 11/155,379, the lift-off process comprises the use of a chemistry which reacts with and/or dissolves some or all of the lift-off materials forming the lift-off stencil under, for example, the optical stack layers. By removing the lift-off materials, the materials of the optical stack layer(s) above the lift-off materials are no longer attached, and float or "lift" off the substrate assembly with the waste chemistry. Other layers formed over the optical stack, e.g., a sacrificial layer, may be lifted-off along with the optical stack. Thus, the lift-off process advantageously provides for the patterning of a plurality of differing and possibly exotic layers using a known chemistry. Removal of the lift-off materials may be accomplished in various ways. For example, the lift-off materials may be exposed to a liquid, gaseous or vaporous lift-off chemistry that reacts with and/or dissolves the lift-off materials, followed by rinsing to remove the materials that are no longer attached. Lift-off chemistry is preferably applied in liquid form, which may be referred to herein as a wet etch lift-off.

Figure 11A:
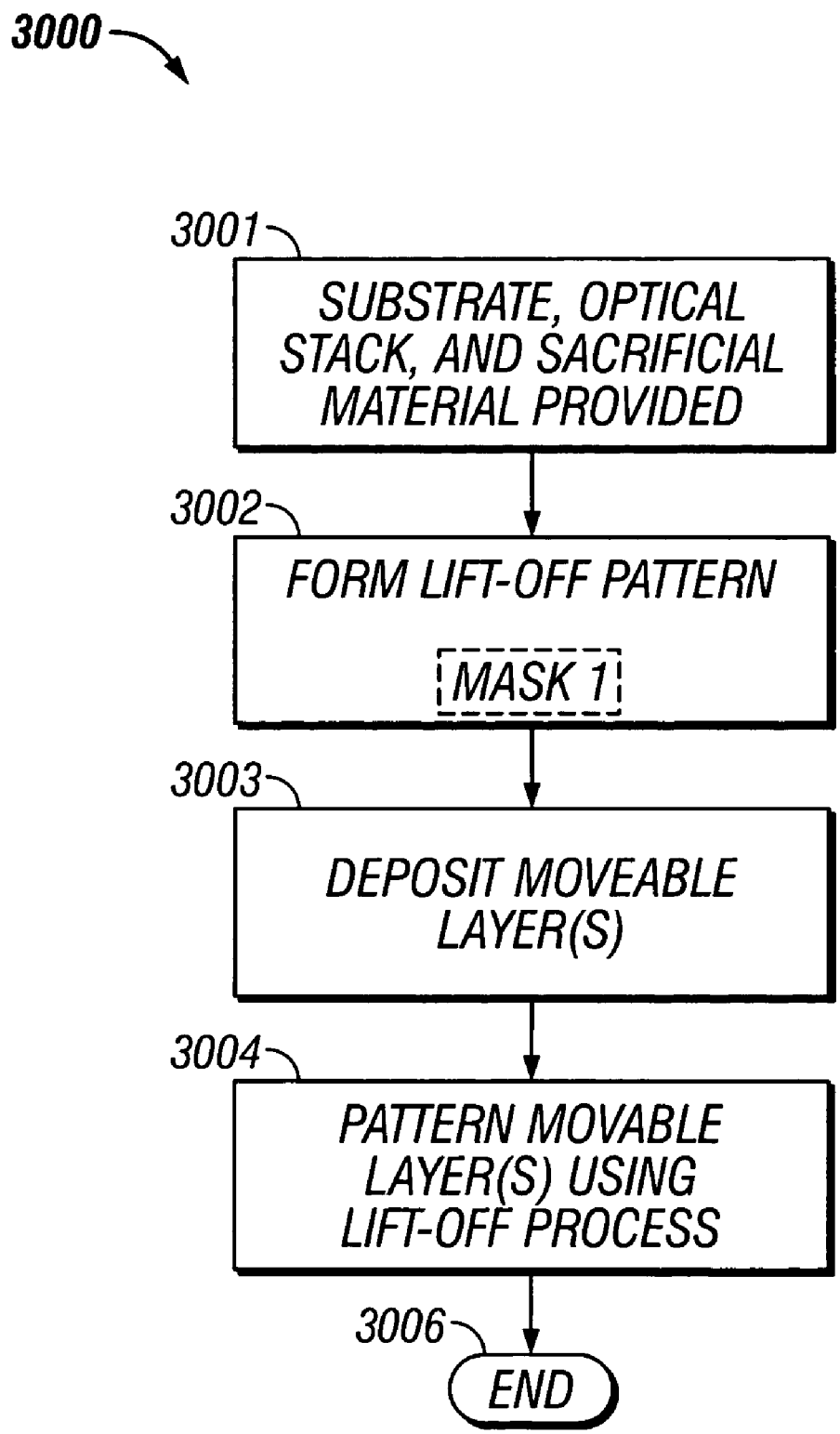
FIGS. 11A and 11B are flow charts illustrating an exemplary fabrication process for fabricating at least a portion of an interferometric modulator.
Figure 11B:
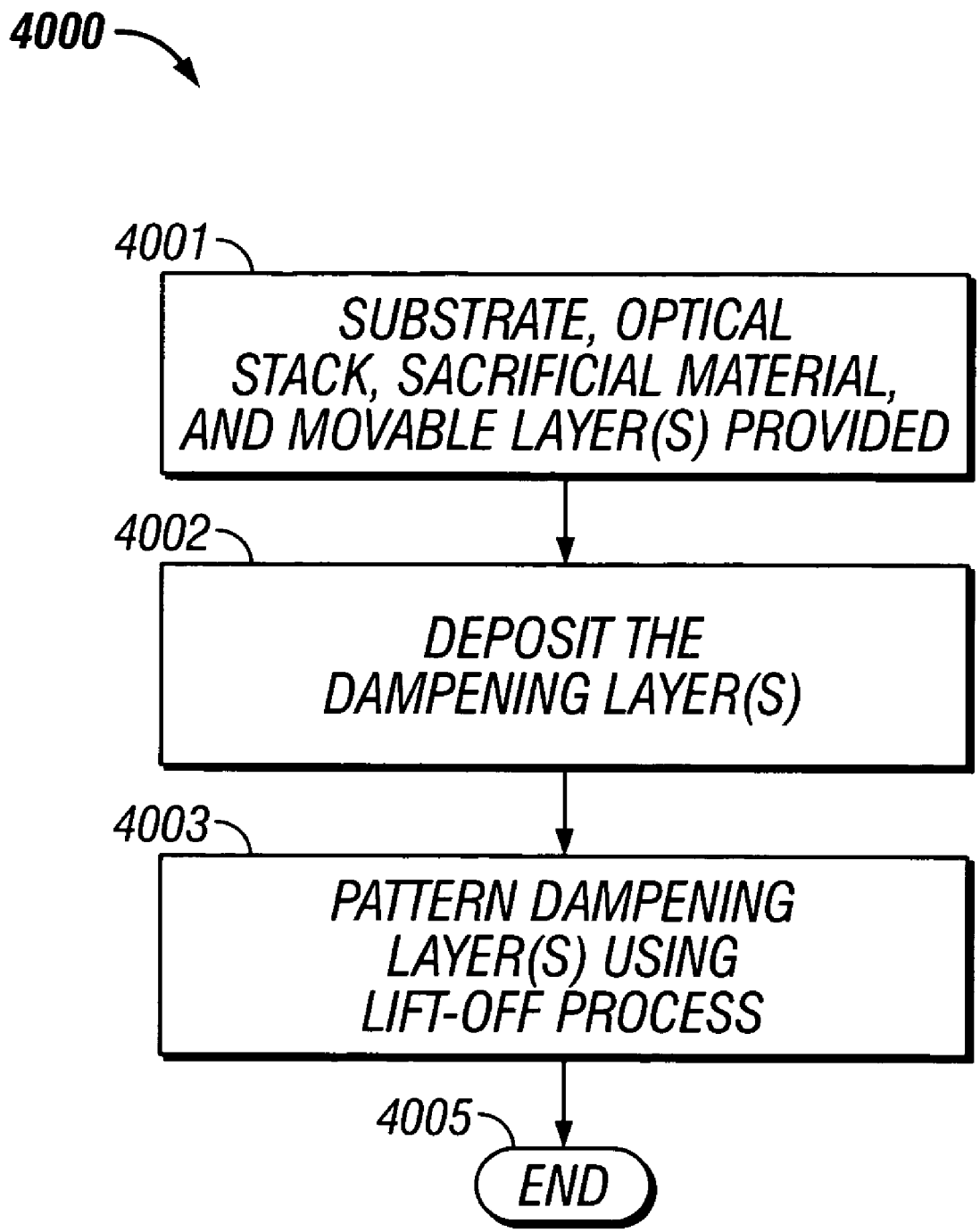

FIGS. 11A and 11B illustrate exemplary flow charts of fabrication processes 3000 and 4000 for fabricating at least a portion of an interferometric modulator, such as, for example, the layers 506a, 506b, 506c, 555 of the embodiments of FIGS. 10A and 10B. Although the fabrication processes 3000 and 4000 describe certain embodiments as being developed in a stacked relationship with elements or layers being placed "above" one another, it is understood and contemplated herein that the stacked relationship may be developed by placing the elements or layers "below" one another.

As shown in FIG. 11A, the fabrication process 3000 starts at Block 3001 where a portion of the interferometric modulator is provided, including the substrate 500, the lower layer 502a, 502b, 502c and the sacrificial material occupying the cavities 498a, 498b, 498c. The process 3000 then proceeds to Block 3002, where a lift-off pattern is formed above the sacrificial material occupying the cavities 498a, 498b, 498c. In an embodiment, the lift-off pattern is formed by depositing a first lift-off material, such as a polyimide release layer (PiRL), which may or may not be photo-patternable. The deposited first lift-off material is then covered with a photoresist. The photoresist provides a pattern geometry, and the first lift-off material and the photoresist are patterned accordingly to form a lift-off stencil. Processing technology using a PiRL layer patterned by use of an additional photoresist layer is commercially available from, for example, Brewer Science, Inc. of Rolla, Mo. However, an artisan will recognize from the disclosure herein that other lift-off materials can be used. For example, the lift-off pattern may advantageously be formed using a single layer of patternable lift-off material such as those commercially available from Futurex Corporation. The thickness of the lift-off stencil is preferably greater than the layers subsequently deposited over the lift-off stencil, to facilitate solvent access and subsequent removal of the lift-off stencil. For example, in some embodiments, the thickness of the lift-off stencil is in the range of from about 1,500 angstroms to about 50,000 angstroms, and in certain embodiments may be in the range of from about 20,000 angstroms to about 30,000 angstroms.

In some embodiments, the lift-off pattern, defined by the lift-off stencil, that is formed above the sacrificial material occupying the cavities 498a, 498b, 498c is configured to provide the holes 550. The lift-off pattern may include one or many holes 550 in one or each of the layers 506a, 506b, 506c.

The fabrication process 3000 also includes Block 3003 where the movable layers 506a, 506b, 506c are formed by depositing one or more layers over the partially fabricated modulator and the lift-off materials. According to one embodiment, the movable layers 506a, 506b, 506c comprise a mirror layer and a flexible metal conductor layer. In an embodiment, the mirror layer comprises an aluminum (Al) layer. The thickness of the mirror layer is typically selected by taking into consideration the reflectivity of the material and the material's structural integrity, e.g., the materials may be freestanding and should be sufficiently thick to survive the stresses of the fabrication processing steps and normal operation. Furthermore, the mirror layer is preferably thick enough to be fully reflective in the exemplary embodiment. In an embodiment, the thickness of the mirror layer is in the range of about 80 angstroms to about 1 micron. For example, in the illustrated embodiment, the mirror layer has a thickness of about 300 angstroms. An artisan will recognize from the disclosure herein that the mirror layer may include, in addition to or instead of aluminum, one or more other reflective materials such as silver (Ag) or gold (Au). The movable layer may be conductive, reflective and/or flexible, and thus, for example, a single structure may function as an electrode layer, a mirror layer and a deformable layer. In some embodiments, e.g., as illustrated in FIG. 7C, the reflective layer 14 is suspended from the deformable layer 34, both of which may function as electrode layers. Various other configurations may also be employed.

In an embodiment, the flexible metal conductor layer in the movable layer comprises a nickel (Ni) layer. The thickness of the conductor layer is typically selected by taking into consideration the material's structural integrity and its ability to withstand the fabrication processing steps. In an embodiment, the thickness of the flexible metal conductor layer is in the range of about 300 angstroms to about 1 micron. For example, in the illustrated embodiment, the conductor layer in the movable layer has a thickness of about 1000 angstroms. An artisan will recognize from the disclosure herein that the conductor layer may include, in addition to or instead of nickel, one or more other conductive materials such as chromium, aluminum, and/or an aluminum alloy. The conductor layer may include a composite structure such as a metal oxide sandwich.

The skilled artisan will recognize from the disclosure herein that some or all of the foregoing movable layer(s) may be chosen at least in part for their adhesion (or lack of adhesion) to the optical stack layer(s) and/or for their adhesion to the supporting structures or post layer. For example, with reference to FIG. 1, the materials of the movable layer 14b are preferably selected to minimize adhesion to the fixed partially reflective layer 16b during actuation of the interferometric modulator 12b. In addition, the materials of the movable layers may be chosen for the adhesion to one another, e.g., to maximize adhesion between the conductor layer and the mirror layer.

The fabrication process 3000 then moves to Block 3004, where the movable layer(s) are patterned using a lift-off process. In a preferred embodiment, the remaining patterned movable layer(s) form a second mirror, a column electrode and a mechanical layer of an interferometric modulator such as interferometric modulators 12a and 12b. The movable layer may be patterned separately from the mirror layer, e.g., to form a configuration such as that illustrated in FIG. 7C. Lift-off processing may be used to advantageously facilitate patterning of relatively thick mirror layers. The movable layer is preferably highly conductive and in tensile stress. The movable layer preferably has the internal material integrity to withstand the stresses of the fabrication process and adhere to the planarization materials.

In an embodiment of lift-off fabrication process of Block 3004, referring to FIGS. 10A and 10B, removal of the lift-off stencil preferably forms a patterned region on the movable layer(s), such as holes 550, and exposes a portion of the underlying sacrificial layer in the lower cavities, such as cavities 498a, 498b, 498c. The lift-off processing illustrated in this embodiment advantageously allows for portions of the movable layer(s) to be removed without etching the deposited materials of interest for the final structure (in this example, without directly etching the movable layer). It has been found that conventional etch removal of such portions of the movable layer may also result in undesired premature etching of the underlying sacrificial layer.

The skilled artisan will recognize from the disclosure herein that various additional processing steps may advantageously remove the sacrificial layer to form a cavity, e.g., the cavity 19 in interferometric modulator 12a in FIG. 1. Moreover, based on the foregoing, the skilled artisan will recognize from the disclosure herein that through the use of lift-off processing, the fabrication process 3000 may be used to advantageously avoid etch compatibility issues and differing and exotic chemistry issues, while advantageously consolidating pattern forming throughout the fabrication process, particularly during fabrication of the movable layer(s) as described above. The fabrication process 3000 may also be used to advantageously reduce processing steps and increase the availability and selection of layer materials and fabrication facilities for the modulator manufacturer. The fabrication process 3000 then ends at Block 3006.

Having described Process 3000, a similar Process 4000 will now be described with reference to FIG. 11B to form the layer 555 having holes 562 as depicted in FIGS. 10A and 10B. The layer 555 is referred to as a dampening layer in FIG. 11B due to its dampening affect on the movable layer(s), where the dampening layer 555 contributes to a differential pressure on the movable layer(s) so as to slow the release time of the movable layer(s). As shown in FIG. 11B, the fabrication process 4000 starts at Block 4001 where a portion of the interferometric modulator is provided, including the substrate 500, the lower layer 502a, 502b, 502c the sacrificial material occupying the cavities 498a, 498b, 498c, the movable layers 506a, 506b, 506c and the sacrificial material above the movable layers 506a, 506b, 506c where cavities 565a, 565b, 565c are to be formed below the dampening layer 555.

The fabrication process 4000 then moves to Block 4002 where the dampening layer 555 is formed by depositing one or more layers over the partially fabricated modulator and the lift-off materials. The dampening layer 555 may be formed out of a variety of materials, including but not limited to metals, dielectric materials, glass, plastic and polymer materials. The dampening layer 555 may be spin coated or deposited using general deposition techniques. The dampening layer 555 may be any suitable thickness, including but not limited to 1000 angstroms to 10 microns.

The fabrication process 4000 then proceeds to Block 4003, where a lift-off pattern, defined by the lift-off stencil, is formed above the sacrificial material occupying the cavities 565a, 565b, 565c. The lift-off pattern may be formed as described with reference to FIG. 11A. However, the lift-off pattern in this embodiment is configured to form one or more holes 562 in the dampening layer 555 after removal of the lift-off stencil. The process 4000 then moves to Block 4005 where the process 4000 ends.

Also, with reference to the fabrication processes illustrated in FIGS. 11A and 11B, another Block may be added to either of the fabrication processes 3000 or 4000 where a structure is added to the interferometric modulator, the structure configured to manipulate the pressures within one or more of the cavities of the interferometric modulator. The structure may be structure 591 discussed with reference to FIG. 10B, including but not limited to a heating element or vacuum device placed within the space 590, such as on the back plate 600; the structure may also be placed at an end of a row of interferometric modulators and configured to be in fluid communication with at least one cavity in each modulator in the row.

Also, with reference to the fabrication processes illustrated in FIGS. 11A and 11B, another Block may be added to either of the fabrication processes 3000 or 4000 where posts above and/or below the movable layer are fabricated and hole(s) are formed into the post(s). These hole(s) are configured to be in fluid communication with one or more cavities within the interferometric modulator and are used in conjunction with a structure, such as a heating element or vacuum device, to manipulate the gas and/or liquid pressure(s) within the one or more cavities. The structure may be structure 591 and the holes may be holes 592 and/or 593 discussed with reference to FIGS. 10B and 10C.

Figure 12A:
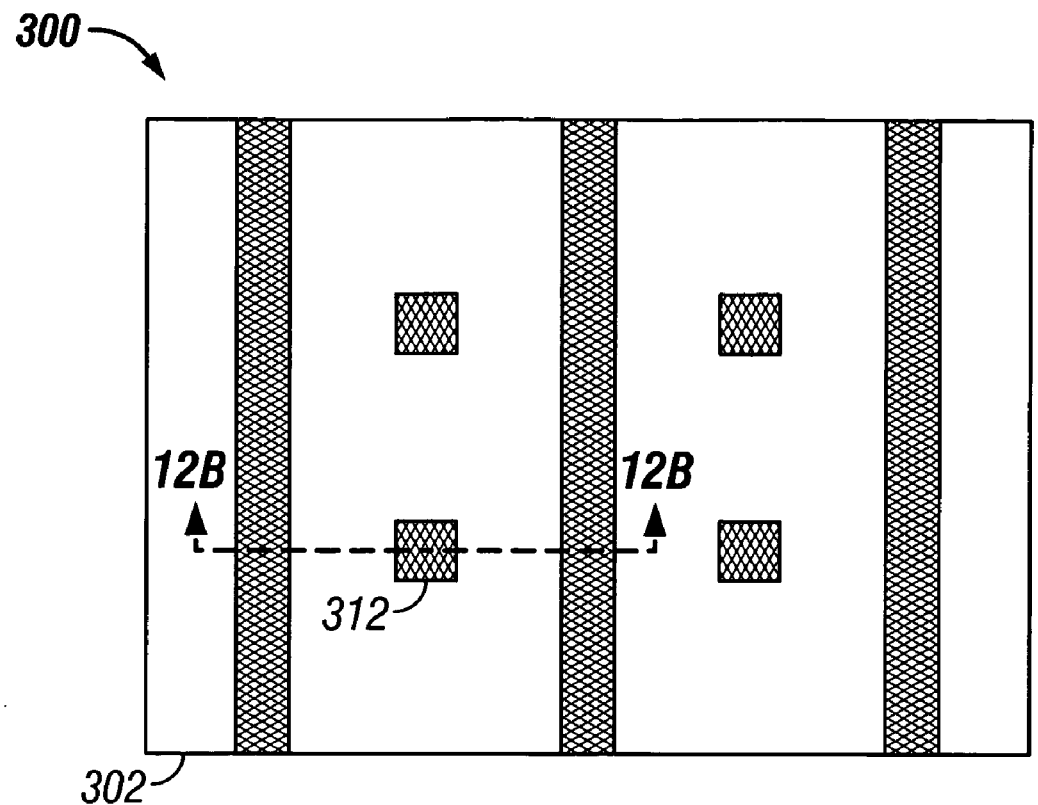
FIG. 12A is a plan view of a partially fabricated interferometric modulator using the fabrication process embodiment of FIGS. 11A and 11B.
Figure 12B:
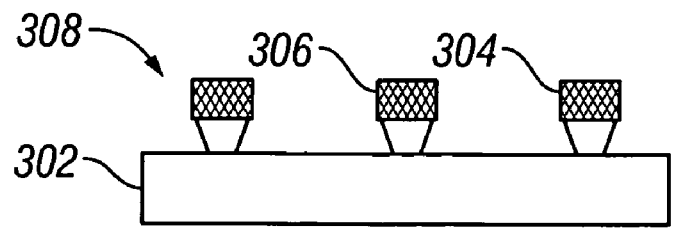
FIG. 12B is a cross sectional view of the modulator of FIG. 12A taken along line 12B-12B.

FIGS. 12A and 12B illustrate respectively plan and cross sectional views of a partially fabricated interferometric modulator 300, according to an embodiment utilizing the lift-off process to form apertures in the movable layer(s) 506a, 506b, 506c and/or dampening layer 555 depicted in FIGS. 10A and 10B. As shown, the modulator 300 includes a partially fabricated interferometric modulator assembly 302, patterned lift-off materials PiRL 304 and photoresist 306, which together form lift-off stencil 308. As shown in FIG. 12B, a cross sectional view taken along line 12B-12B in FIG. 12A, the lift-off materials may advantageously form an upside-down trapezoidal or rough letter "T" shape by selectively over-etching the PiRL material 304. The T-shape may help to facilitate lift-off because materials deposited on the upper portion of the T-shape are separated from materials deposited on the substrate near the base of the T-shape. The T-shape may also facilitate exposure of the lift-off stencil 308 to the lift-off chemistry. Holes 550 or 562 can be formed in a region 312 as indicated in FIG. 12A.

Figure 13A:
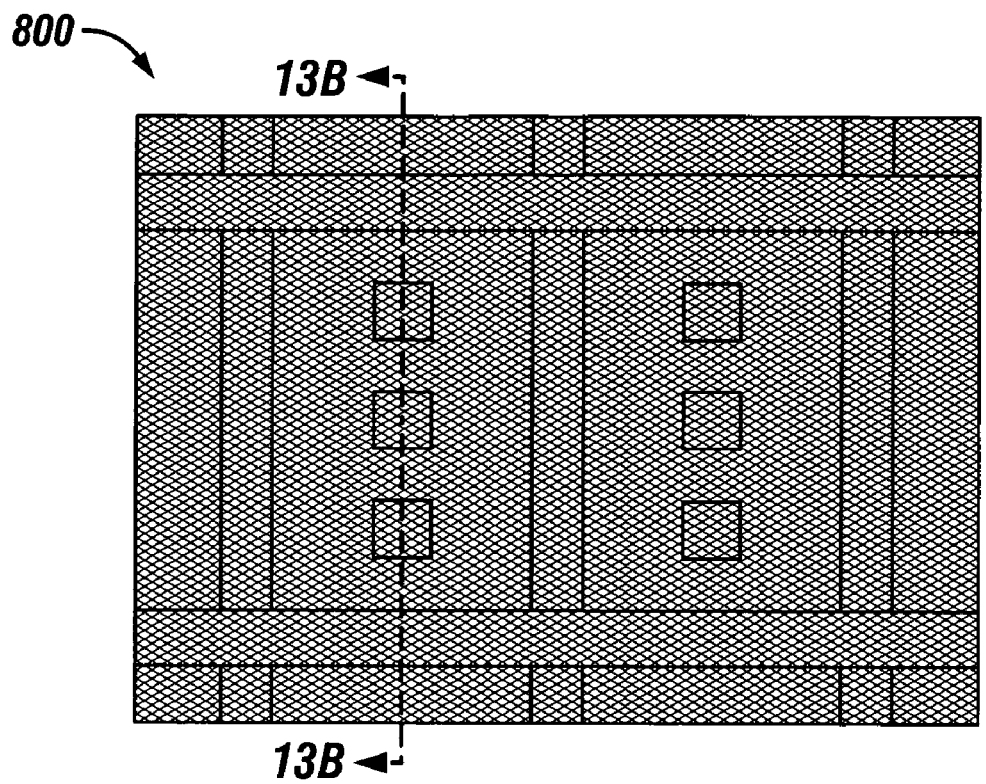
FIG. 13A is a plan view of a partially fabricated interferometric modulator using the fabrication process embodiment of FIGS. 11A and 11B.
Figure 13B:
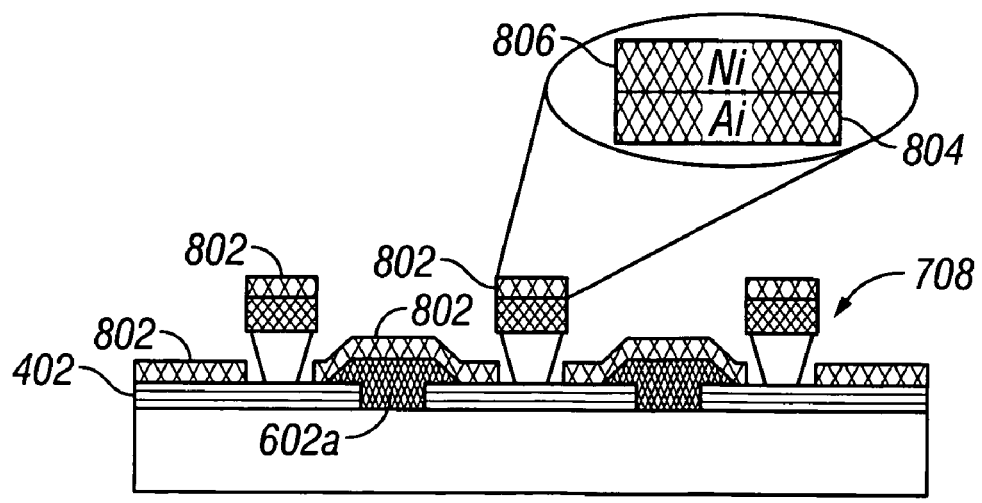
FIG. 13B is a cross sectional view of the modulator of FIG. 13A taken along line 13B-13B.

FIGS. 13A and 13B illustrate respectively plan and cross sectional views of a partially fabricated interferometric modulator 800, according to an embodiment. As shown, the modulator 800 includes a movable layer 802 formed over the stack 402, the lift-off stencil 708, and the posts 602a. As shown in FIG. 13B, a cross sectional view taken along line 13B-13B in FIG. 13A, the movable layer 802 may advantageously comprise an Al mirror layer 804 and a Ni conductor layer 806. The Al mirror layer 804 and Ni conductor layer 806 may be formed in various ways, e.g., by physical vapor deposition or sputter deposition. Apertures may be formed in the movable layer 802 using etching techniques, the lift-off process, or other suitable patterning techniques.

Figure 14A:
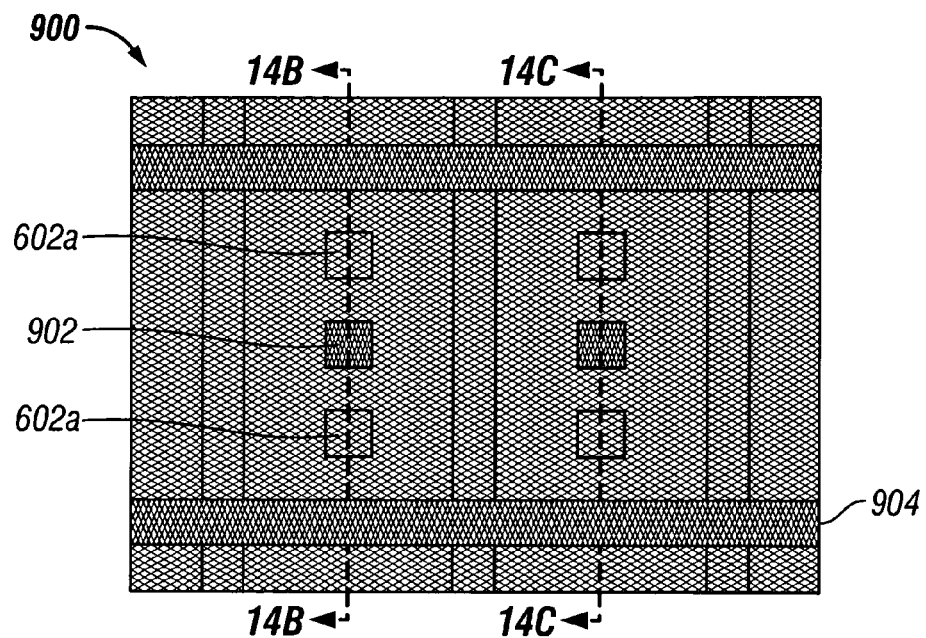
FIG. 14A illustrates a plan view of a partially fabricated interferometric modulator using the fabrication process embodiment of FIGS. 11A and 11B.
Figure 14B:
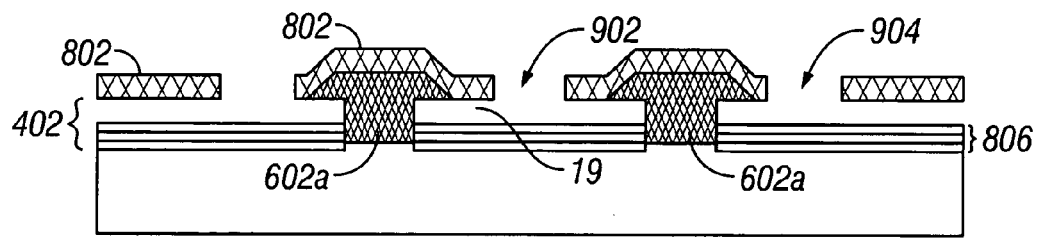
FIGS. 14B and 14C illustrate cross sectional views of the partially fabricated interferometric modulator of FIG. 14A taken along lines 14B-14B and 14C-14C respectively.
Figure 14C:
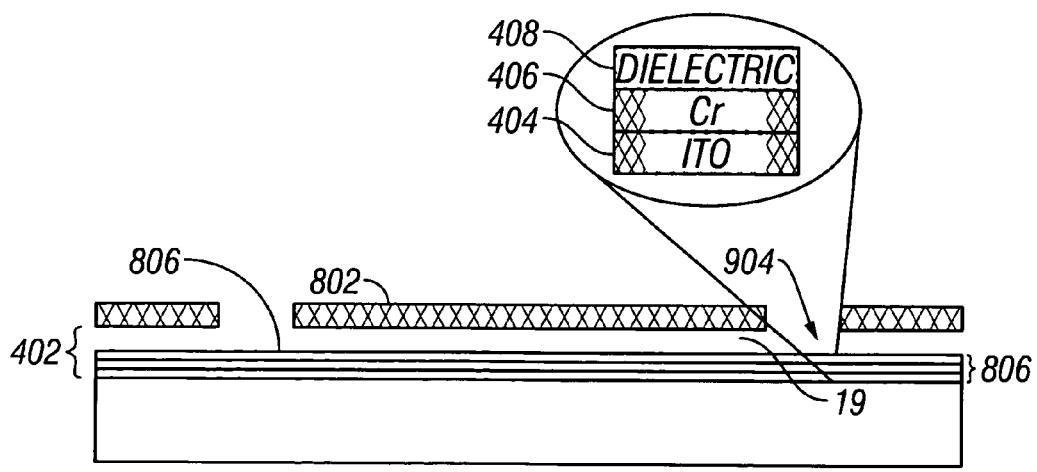

FIG. 14A illustrates a plan view, and FIGS. 14B and 14C illustrate cross sectional views taken along lines 14B-14B and 14C-14C respectively, of an interferometric modulator 900, according to an embodiment. As shown, the modulator 900 includes patterned movable layer 802 (including Al mirror layer 804 and Ni conductor layer 806 depicted in FIG. 13B) after the lift-off process has occurred, during which the lift-off stencil 708 was removed (along with the portions of the movable layer 802 deposited on the lift-off stencil 708 as shown in FIGS. 14A and 14B). Removal of the lift-off stencil 708 results in the formation of apertures 902, 904.

FIGS. 14B and 14C also illustrate the post-processing removal of the sacrificial layer from the stack 402, forming an optical stack 806 that includes the ITO layer 404, the Cr layer 406, and the dielectric layer 408. Removal of the sacrificial layer from the stack 402 also results in the formation of a cavity 19 of the modulator 900. The posts 602a are supporting structures for the patterned movable layer 802 and also serve to define the cavity 19. In an embodiment, removal is accomplished by exposing the modulator 800 to xenon fluoride ($XeF_2$), which flows through the apertures 902, 904 to chemically react with the Mo sacrificial layer of the stack 402, causing the sacrificial layer to be removed by a dry etching process and thereby forming the cavity 19. The sacrificial material occupying the cavities 565a, 565b, 565c may also be etched away using a similar process described with reference to FIGS. 14A through 14C.

Although the foregoing embodiments of the process of fabricating an interferometric modulator have been described in terms of certain preferred embodiments, other embodiments will be apparent to those of ordinary skill in the art from the disclosure herein. For example, the lift-off processes can advantageously be applied to only one, some or none of the various layers of the optical stack or movable layer. Moreover, various interferometric device structures and shapes may also be formed using the above described lift-off processes. The skilled artisan will also appreciate that methods described herein as being applicable to the fabrication of individual interferometric modulators are also suitable for the fabrication of arrays of interferometric modulators. Likewise, it will be understood that methods described herein as being applicable to the fabrication of arrays of interferometric modulators are also suitable for the fabrication of individual interferometric modulators.

It will be understood by those of skill in the art that numerous and various modifications can be made without departing from the spirit of the present invention. Therefore, it should be clearly understood that the forms of the present invention are illustrative only and are not intended to limit the scope of the present invention.

The invention claimed is:

1. A microelectromechanical (MEMS) device, comprising:
    a substrate;
    a movable first layer, the first layer and the substrate configured to have a first cavity therebetween, the first cavity having a first pressure, the first layer movable with respect to the substrate in response to a voltage applied to at least the first layer and wherein movement of the first layer deforms the first cavity;
    a second layer, separate from the substrate, and disposed so the first layer is between the second layer and the substrate, the second layer and the first layer configured to have a second cavity therebetween, the second cavity having a second pressure; and
    a structure, separate from the first and second layers, the structure being in fluid communication with at least one of the first and second cavities, the structure configured to manipulate at least one of the first and second pressures to alter a speed of the movable first layer when the movable first layer is actuated and released;
    wherein at least one of the second layer and the substrate are at least partially transparent to light incident upon the device.

2. The MEMS device of claim 1, wherein the structure is in fluid communication with both the first and second cavities, the structure configured to manipulate both the first and second pressures.

3. The MEMS device of claim 1, wherein one of the first pressure and the second pressure is a gas pressure.

4. The MEMS device of claim 3, wherein the first pressure and the second pressure are air pressures.

5. The MEMS device of claim 1, wherein one of the first pressure and the second pressure is a liquid pressure.

6. The MEMS device of claim 1, wherein the structure comprises a heating element.

7. The MEMS device of claim 6, wherein the second layer is disposed between the heating element and the first layer.

8. The MEMS device of claim 7, further comprising a back plate, wherein the second layer is disposed between the back plate and the first layer.

9. The MEMS device of claim 8, wherein the heating element is disposed between the back plate and the second layer.

10. The MEMS device of claim 6, wherein the second layer comprises at least one aperture fluidly coupling the second cavity and the heating element.

11. The MEMS device of claim 10, wherein the first layer comprises at least one aperture fluidly coupling the first cavity and the second cavity.

12. The MEMS device of claim 1, wherein the structure comprises a vacuum device.

13. The MEMS device of claim 12, wherein the vacuum device is configured to manipulate the first and second pressures independently from one another.

14. The MEMS device of claim 13, further comprising at least one support structure between the substrate and the first layer, the at least one support structure comprising at least one aperture such that the first cavity is in fluid communication with the vacuum device.

15. The MEMS device of claim 14, further comprising at least one support structure between the first layer and the second layer, the at least one support structure comprising at least one aperture such that the second cavity is in fluid communication with the vacuum device.

16. The MEMS device of claim 12, wherein the vacuum device is configured to manipulate the first and second pressures together.

17. The MEMS device of claim 12, wherein the second layer comprises at least one aperture, wherein the first layer comprises at least one aperture, and wherein the first and second cavities are in fluid communication with one another.

18. The MEMS device of claim 1, wherein the second layer is spaced from the first layer by a distance between 200 to 2000 angstroms.

19. The MEMS device of claim 18, further comprising a back plate, wherein the second layer is disposed between the back plate and the first layer.

20. The MEMS device of claim 1, wherein the substrate comprises glass.

21. The MEMS device of claim 20, further comprising a third layer disposed between the first layer and the substrate, wherein the movable first layer is reflective of light and the third layer is partially reflective of light.

22. The MEMS device of claim 1, further comprising:
    a display;
    a processor that is in electrical communication with said display, said processor being configured to process image data;
    a memory device in electrical communication with said processor.

23. The MEMS device of claim 22, further comprising:
    a driver circuit configured to send at least one signal to said display.

24. The MEMS device of claim 23, further comprising:
    a controller configured to send at least a portion of said image data to said driver circuit.

25. The MEMS device of claim 22, further comprising:
an image source module configured to send said image data to said processor.

26. The MEMS device of claim 25, wherein said image source module comprises at least one of a receiver, transceiver, and transmitter.

27. The MEMS device of claim 22, further comprising:
an input device configured to receive input data and to communicate said input data to said processor.

28. A microelectromechanical (MEMS) device, comprising:
a substrate;
a first layer comprising at least one aperture, the first layer and the substrate configured to have a first cavity therebetween, the first layer movable with respect to the substrate in response to a voltage applied to at least the first layer; and
a second layer comprising at least one aperture, the second layer and the first layer configured to have a second cavity therebetween, wherein the first and second cavities are in fluid communication through the at least one aperture of the first layer.

29. The MEMS device of claim 28, further comprising a back plate, wherein the second layer is disposed between the back plate and the first layer.

30. The MEMS device of claim 28, wherein the second layer is spaced from the first layer by a distance between 200 to 2000 angstroms.

31. The MEMS device of claim 28, wherein the second layer is between 1000 angstroms to 10 microns thick.

32. The MEMS device of claim 28, further comprising:
a display;
a processor that is in electrical communication with said display, said processor being configured to process image data;
a memory device in electrical communication with said processor.

33. The MEMS device of claim 32, further comprising:
a driver circuit configured to send at least one signal to said display.

34. The MEMS device of claim 33, further comprising:
a controller configured to send at least a portion of said image data to said driver circuit.

35. The MEMS device of claim 28, further comprising:
an image source module configured to send said image data to said processor.

36. The MEMS device of claim 35, wherein said image source module comprises at least one of a receiver, transceiver, and transmitter.

37. The MEMS device of claim 28, further comprising:
an input device configured to receive input data and to communicate said input data to said processor.

38. The MEMS device of claim 28, wherein the substrate comprises glass.

39. The MEMS device of claim 28, further comprising a third layer disposed between the first layer and the substrate, wherein the movable first layer is reflective of light and the third layer is partially reflective of light.

40. The MEMS device of claim 28, wherein the at least one aperture of the first layer and the at least one aperture of the second layer are not aligned with one another.

41. The MEMS device of claim 28, wherein the first and second layers each comprise edge portions, wherein the at least one aperture of the first or second layer is formed on an edge portion of the first or second layer.

42. The MEMS device of claim 28, wherein the substrate, first layer and second layer comprise a pixel.

43. The MEMS device of claim 42, further comprising an array of pixels.

44. A microelectromechanical (MEMS) device, comprising:
means for supporting a MEMS device;
means for reflecting light, the supporting means and the reflecting means configured to have a first cavity therebetween, the first cavity having a first pressure;
means for enclosing a second cavity, wherein said second cavity is located between said enclosing means and said reflecting means, the second cavity having a second pressure; and
means for manipulating at least one of the first and second pressures.

45. The MEMS device of claim 44, wherein the means for manipulating at least one of the first and second pressures comprises at least one of the following: a heating element and a vacuum device.

46. The MEMS device of claim 44, wherein said supporting means comprise a substrate.

47. The MEMS device of claim 44, wherein said reflecting means comprises a reflective material.

48. The MEMS device of claim 44, wherein said enclosing means comprises a layer of material.

49. The MEMS device of claim 48, wherein said reflecting means is configured to be movable, and said enclosing means is configured to dampen movement of the reflecting means.

50. The MEMS device of claim 49, further comprising a back plate, wherein the enclosing means is disposed between the back plate and reflecting means.

51. The MEMS device of claim 50, wherein the manipulating means is located on said back plate.

52. The MEMS device of claim 44, wherein said enclosing means comprises a back plate.

53. The MEMS device of claim 44, wherein one of the first pressure and the second pressure is a gas pressure.

54. The MEMS device of claim 44, wherein the first pressure and the second pressure are air pressures.

55. The MEMS device of claim 44, wherein one of the first pressure and the second pressure is a liquid pressure.

56. A microelectromechanical (MEMS) device, comprising:
means for supporting a MEMS device;
means for conducting electricity, the conducting means comprising at least one aperture, the conducting means configured to be movable with respect to the supporting means in response to a voltage applied to at least the conducting means, the supporting means and the conducting means configured to have a first cavity therebetween; and
means for dampening movement of the conducting means, the dampening means comprising at least one aperture, the conducting means and the dampening means configured to have a second cavity therebetween.

57. The MEMS device of claim 56, wherein said supporting means comprise a substrate.

58. The MEMS device of claim 56, wherein said conducting means comprises a conductive material.

59. The MEMS device of claim 58, wherein said conducting means comprises a reflective material.

60. The MEMS device of claim 56, wherein said dampening means comprises a layer of material.

61. The MEMS device of claim 56, further comprising a back plate, wherein the dampening means is disposed between the back plate and the conducting means.

62. A microelectromechanical (MEMS) device comprising:

a substrate;

a movable layer mechanically coupled to the substrate, the movable layer movable between a first position and a second position, wherein the movable layer is configured to move from the second position to the first position at a first rate and wherein the movable layer is configured to move from the first position to the second position at a second rate that is faster than the first rate;

a cavity defined between the substrate and the movable layer; and a fluid conductive element comprising at least one aperture through which fluid within the MEMS device is configured to flow, wherein the fluid flows from inside the cavity to outside the cavity through the fluid conductive element at a first flowrate upon movement of the movable layer from the first position to the second position and from outside the cavity to inside the cavity through the fluid conductive element at a second flowrate upon movement of the movable layer from the second position to the first position, the second flowrate slower than the first flowrate.

63. The MEMS device of claim 62, wherein the fluid conductive element comprises a layer disposed on a side of the movable layer opposite the substrate.

64. The MEMS device of claim 62, wherein the first position is further from the substrate than is the second position.

65. The MEMS device of claim 62, wherein the MEMS device is substantially reflective to incident light when the movable layer is in the second position and wherein the MEMS device is substantially non-reflective to incident light when the movable layer is in the first position.

66. The MEMS device of claim 62, further comprising a partially reflective layer between the substrate and the movable layer.

67. The MEMS device of claim 62, wherein the fluid comprises air.

68. The MEMS device of claim 62, wherein the fluid comprises a liquid.

69. The MEMS device of claim 62, wherein the fluid conductive element comprises at least one aperture through the movable layer.

70. The MEMS device of claim 62, further comprising a support structure between the movable layer and the substrate.

71. The MEMS device of claim 70, wherein the support structure includes at least one wall surrounding the cavity, the at least one wall configured to inhibit fluid flow between inside the cavity and outside the cavity.

* * * * *